US011699362B2

(12) United States Patent
Church et al.

(10) Patent No.: US 11,699,362 B2
(45) Date of Patent: Jul. 11, 2023

(54) SELF-EXPIRING IDENTIFICATION BANDS AND METHODS OF USE THEREOF

(71) Applicant: Precision Dynamics Corporation, Valencia, CA (US)

(72) Inventors: Jeana Church, West Bend, WI (US); Harry Miesner, Wauwatosa, WI (US); Ryan Worm, Port Washington, WI (US); Rajesh Guntupalli, Glendale, WI (US); Kevin J. Stafeil, Delafield, WI (US); Andrew Schmitt, Porter Ranch, CA (US); Kyle Beljanski, North Hollywood, CA (US)

(73) Assignee: Precision Dynamics Corporation, Valencia, CA (US)

( * ) Notice: Subject to any disclaimer, the term of this patent is extended or adjusted under 35 U.S.C. 154(b) by 0 days.

(21) Appl. No.: 17/313,776

(22) Filed: May 6, 2021

(65) Prior Publication Data

US 2021/0358336 A1 Nov. 18, 2021

Related U.S. Application Data

(60) Provisional application No. 63/026,540, filed on May 18, 2020.

(51) Int. Cl.
*G09F 3/00* (2006.01)
*B32B 7/12* (2006.01)
(Continued)

(52) U.S. Cl.
CPC .............. *G09F 3/0291* (2013.01); *B32B 7/12* (2013.01); *C09J 7/29* (2018.01); *G09F 3/005* (2013.01);
(Continued)

(58) Field of Classification Search
CPC ................... G09F 3/0291; G09F 3/005; G09F 2003/0257; G09F 2003/0213;
(Continued)

(56) References Cited

U.S. PATENT DOCUMENTS 4,612,718 A * 9/1986 Golub ..................... G09F 3/005
40/633
4,903,254 A 2/1990 Haas
(Continued)

FOREIGN PATENT DOCUMENTS

CA 2717452 A1 11/2009
WO 9300669 A1 1/1993
(Continued)

OTHER PUBLICATIONS

European Patent Office, Extended Search Report, Application No. 21174056.8, dated Oct. 15, 2021, 10 pages.

*Primary Examiner* — Patricia L. Nordmeyer
(74) *Attorney, Agent, or Firm* — Quarles & Brady LLP

(57) ABSTRACT

A self-expiring band structure is activated upon the contacting of two chemical constituents together. This contacting may be performed by the attachment action of the band or independently thereof. After a time duration has passed, the coaction of the chemical constituents result in a visually perceptible change can alert others to the fact the band has expired. These bands may be both printable, such as by a printer or other machine printing, as well as time-expiring making them a very versatile product that offer heightened security at the price point closer to that of a disposable item because they do not require complex infrastructure for validation.

31 Claims, 11 Drawing Sheets

(51) Int. Cl.
*G09F 3/02* (2006.01)
*C09J 7/29* (2018.01)

(52) U.S. Cl.
CPC ....... *B32B 2255/24* (2013.01); *B32B 2307/40* (2013.01); *C09J 2301/122* (2020.08); *C09J 2301/16* (2020.08); *C09J 2301/41* (2020.08); *G09F 2003/0257* (2013.01)

(58) Field of Classification Search
CPC . G09F 2003/028; B32B 7/12; B32B 2255/24; B32B 2307/40; C09J 7/29; C09J 2301/122; C09J 2301/16; C09J 2301/41
See application file for complete search history.

(56) References Cited

U.S. PATENT DOCUMENTS

| | | |
|---|---|---|
| 5,364,133 A | 11/1994 | Hofer et al. |
| 5,446,705 A | 8/1995 | Haas et al. |
| 5,719,828 A | 2/1998 | Haas et al. |
| 5,785,354 A | 7/1998 | Haas |
| 5,822,280 A | 10/1998 | Haas |
| 6,752,430 B2 | 6/2004 | Holt et al. |
| 7,294,379 B2 * | 11/2007 | Ko ........................ G09F 3/0291 368/327 |
| 7,742,366 B2 | 6/2010 | Haas |
| 7,742,367 B2 | 6/2010 | Haas |
| 8,840,978 B2 | 9/2014 | Taghavi |
| 9,110,446 B2 | 8/2015 | Kasper et al. |
| 9,114,187 B2 | 8/2015 | Hofer et al. |
| 9,842,517 B1 | 12/2017 | Amami et al. |
| 9,958,836 B2 | 5/2018 | Kasper et al. |
| D851,357 S | 6/2019 | Ennis et al. |
| 2013/0161937 A1 | 6/2013 | Takashima et al. |
| 2015/0136631 A1 | 5/2015 | Seidl |
| 2017/0329285 A1 | 11/2017 | Kasper et al. |
| 2020/0388196 A1 | 12/2020 | Lewis et al. |

FOREIGN PATENT DOCUMENTS

| | | |
|---|---|---|
| WO | 9742552 A1 | 11/1997 |
| WO | 2013014936 A1 | 1/2013 |

\* cited by examiner

SELF-EXPIRING IDENTIFICATION BANDS AND METHODS OF USE THEREOF

CROSS-REFERENCE TO RELATED APPLICATION

This application claims the benefit of, and priority from, U.S. Provisional Application No. 63/026,540 filed May 18, 2020, which is hereby incorporated by reference in its entirety.

FIELD OF INVENTION

This invention relates to self-expiring identification bands. In particular, this invention relates to an identification wristband wherein after a predetermined amount of time has elapsed from the initial activation of the band, the band exhibits a visual signal that can be easily and rapidly viewed.

BACKGROUND

Many events, gatherings, businesses, and hospitals use bands such as wristbands to signal various types of authorizations or for identification purposes. In many cases, the bands can be designed to perform both functions simultaneously. Such bands frequently come in strip form and are formed into a loop either by the locking of a clasp or by the use of adhesive. Typically, the loop is formed to the desired length while placing the band around the wearer and is made small enough that it should not be possible to remove the band (e.g., sliding it over a hand or foot) without breaking or cutting the band.

However, such conventional bands are problematic in that a wearer might chose not to remove the band and could attempt to use it in an unauthorized or non-permitted way at a later time or location. Often times, depending on the security schema, it may not be easy to detect such misuse visually and quickly. Further still, if user is able to get the band removed (for example, by sliding a closed band off his or her wrist or by defeating the clasp or adhesive mechanism in such a way that the band could be re-secured into a loop again), then the band potentially could be reused by another person impermissibly.

Certain band systems may include printed information on them such as the individual's name, the time of validity, and/or the location of validity to prevent such misuse, but this may require close inspection of the band by someone reviewing it, which can be costly and labor intensive. While certain developments have also been made in "smart" bands, which may, for example, employ RFID or other near field communication that can be read by a reader, such smart bands are relatively expensive to product and require supporting technology infrastructure.

SUMMARY

In view of the state of the art, there remains a strong unmet need for a relatively inexpensive, but secure band that can better help to establish impermissible use conditions without complicated infrastructure.

Disclosed herein are improved wristbands and associated systems in which the wristband is designed to provide a visual indication some pre-determined amount of time after the band has been activated. Such activation could involve a conventional adhesive band attachment in which the adhesive includes a chemical composition that coacts with another chemical composition in the surface it is being attached to in order to initiate a time-dependent reaction. In this way, the attachment of the band and the activation occur contemporaneously. Then, after a pre-determined amount of time, a viewable surface of the band exhibits a visible change (e.g., changes to a bright color or displays a text messages such as "VOID" or "EXPIRED") that indicates the band has expired.

In some modified forms of this concept, the activation may not be directly tied to the attachment or securing means for the band, but rather may be a separate flap that can be folded over to initiate the coaction or a separate sticker that is attached that creates a change in time. Depending on the use case, these mechanisms may be preferable to one that activates during attachment, since the time of attachment may not be a factor in assessing the time of indicated expiration.

Still further, these time-expiring band are of such a construction—that is thin and sheet like) that they may be readily printable to include further information about the wearer or conditions under which the band is a valid in addition to providing the expiratory function.

According to one aspect, a looped self-expiring identification band is provided. The band includes a facestock that is elongated in the longitudinal direction between a pair of ends and having a top surface and a bottom surface. A first chemical composition is disposed on at least a portion of the top surface of the facestock and a second chemical composition is disposed on at least a portion of the bottom surface of the facestock. The facestock is wrapped on itself to form a loop with the top surface of the band facing away from the object and the ends of the facestock overlapping each other to form an overlapped portion. In at least a part of the overlapped portion, the first chemical composition and the second chemical composition contact each other and coact to form one or more expiration zones that provide a visually perceptible change at a pre-established time after contact. For any given 180 degree section of the looped self-expiring identification band, one or more of the one or more expiration zones are positioned at least in part in that respective 180 degree section. Put differently, at any given viewing angle of the top surface or outer surface of the looped band, one or more expiration zones may be viewable upon expiration. To be clear, this does not necessarily apply to a specific expiration zone being viewable at all viewing angles (although a single expiration zone extending more than 180 degrees would be), but that some of the expiration zone(s) should be visible irrespective of the angle viewed.

According to another aspect, a self-expiring identification band is provided. The self-expiring identification band includes a facestock that is elongated in the longitudinal direction and has a top surface and a bottom surface. A first chemical composition is disposed on at least a portion of the top surface of the facestock. This portion of the top surface runs at least a third of a length of the facestock. A second chemical composition is disposed on at least a portion of the bottom surface of the facestock. This portion also runs at least a third of the length of the facestock. These first and second chemical compositions are coactable to cause a visually perceptible change to the top surface of the facestock.

In some forms, the band may be wrappable around an object such that the top surface of the band faces away from the object, the ends of the facestock overlap each other to form an overlapped portion, and the first and second chemical compositions contact each other in at least a part of the overlapped portion to form an expiration zone. In this form, when the band is wrapped around an object such that a loop is formed, at least some of the expiration zone (or zones) may be visible from two opposing views of the band. The expiration zone may run along at least 50% of the length of the facestock after being formed into a loop.

In some forms, the first chemical composition may be an ink (for example, comprising anthraquinone dyes and compositions made thereof) that is soluble in the second chemical composition and the second chemical composition may comprise an adhesive.

In some forms, the facestock may include lateral edges and a central portion. The first chemical composition may be disposed proximate to the lateral edges of the facestock with a central portion being void of the first chemical composition.

In some forms, portions of the facestock bearing the first chemical composition may have a larger width than portions of the facestock not bearing the first chemical composition.

According to another aspect, a self-expiring identification band is provided. Again, the band includes a facestock that is elongated in the longitudinal direction and has a top surface and a bottom surface. The band also includes a first chemical composition that is disposed on multiple, noncontiguous portions of the top surface of the facestock that are separated from each other by portions of the top surface of the facestock that do not bear the first chemical composition. The band further includes a second chemical composition disposed on at least a portion of the bottom surface of the facestock. The first and second chemical compositions are coactable to cause a visually perceptible change to the top surface of the facestock.

In some forms, the portions of the top surface of the facestock that do not bear the first chemical composition may separate the portions of the top surface of the facestock that do bear the first chemical composition along the longitudinal axis of the facestock.

In some forms, the band may be wrappable around an object, such that the top surface of the band faces away from the object, the ends of the facestock overlap each other to form an overlapped portion, and the second chemical composition contact each other in at least a part of the overlapped portion to form an expiration zone. The top surface of the band may define or extend 360 degrees when the band is wrapped around an object and the largest portion of the facestock that does not bear the first chemical composition may not occupy more than 90 degrees of the wrapped band. In some cases, there may be at least three expiration zones.

In some forms, the first chemical composition may be an ink (for example, comprising anthraquinone dyes and compositions made thereof) that is soluble in the second chemical composition and the second chemical composition may comprise an adhesive.

In some forms, the facestock may include lateral edges and a central portion. In such forms, the first chemical composition may be disposed proximate to the lateral edges of the facestock with the central portion being void of the first chemical composition.

According to yet another aspect, a self-expiring identification band is provided. The band again includes a facestock that is elongated in the longitudinal direction and having a top surface and a bottom surface. In this case, the band also has a foldable tab disposed along at least part of an edge of the facestock. A first chemical composition is disposed on at least a portion of the bottom surface of the foldable tab and a second chemical composition is disposed on at least a portion of the bottom surface of the facestock. The first and second chemical compositions are coactable to cause a visually perceptible change to the top surface of the facestock.

In some forms, when the tab is folded such that a portion of the top surface of the tab bearing the first chemical composition contacts at least part of a portion of the top surface of the facestock bearing the second chemical composition, an overlapped portion may be formed in which the first chemical composition and the second chemical composition contact each other in at least a part of the overlapping portion to form at least one expiration zone. In the expiration zone(s), the first and second chemical compositions can coact to cause the visually perceptible change to the band in the expiration zone. The overlapped portion may run along less than an entire length of the facestock; for example, the overlapped portion may run along less than 80% of a length of the facestock.

In some forms, the first chemical composition may be an ink (for example, comprising anthraquinone dyes and compositions made thereof) that is soluble in the second chemical composition and the second chemical composition may comprise an adhesive.

In some forms, the tab may be disposed along at least part of a lateral edge of the facestock while, in other form, the tab may be disposed along at least part of a longitudinal edge of the facestock.

According to still another aspect, a self-expiring identification band is provided. This band again includes a facestock that is elongated in the longitudinal direction and having a top surface and a bottom surface and further includes an adhesive article having a bottom surface and a top surface. The adhesive article initially is detachable or separate from the elongated band. A first chemical composition is disposed on at least a portion of the top surface of the facestock and a second chemical composition is disposed on at least a portion of the bottom surface of the adhesive article. The adhesive article is applicable to the facestock such that at least part of the bottom surface of the adhesive article contacts at least part of the top surface of the facestock to form an overlapped portion. The first and second chemical compositions are coactable to cause a visually perceptible change to the top surface of the adhesive article.

In some forms, when the adhesive article is applied to the facestock such that a portion of the bottom surface of the adhesive article bearing the second chemical composition contacts at least part of a portion of the top surface of the facestock bearing the first chemical composition, an overlapped portion may be formed. The first chemical composition and the second chemical composition can contact each other in at least a part of the overlapping portion to form at least one expiration zone and coact to cause the visually perceptible change to the band in the expiration zone.

In some forms, the first chemical composition may be an ink (for example, comprising anthraquinone dyes and compositions made thereof) that is soluble in the second chemical composition and the second chemical composition may comprise an adhesive.

According to still yet another aspect, a method of using a self-expiring identification band is provided. Information is printed on a portion of the self-expiring identification band of the types above (in which the self-expiring identification band includes a facestock that is elongated in the longitudinal direction and the self-expiring identification further includes one or both of a first and a second chemical composition). The self-expiring identification band is manipulated such that the first chemical composition and second chemical composition contact each other. The first and second chemical compositions coact for a predetermined amount of time, such that after said predetermined amount of time there is a visibly perceptible change on the top surface of band.

In some forms, the method may further include machine printing information on a portion of the self-expiring identification band.

In some forms, the method further may include the step of wrapping the self-expiring identification band around an object or a body part (such as, for example, a wrist), such that at least a portion of the band overlaps itself.

In some forms, the method may further include wrapping the self-expiring identification band around a body part, such that at least a portion of the band overlaps itself.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1A:
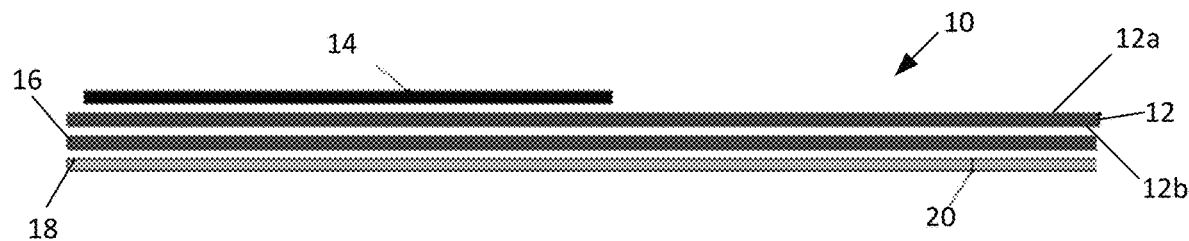
FIGS. 1A-1B are a schematic side and top view, respectively, of a first embodiment of a band with a soluble ink on top surface of a facestock of the band and an exposable adhesive on the bottom surface with a composition that is capable of solubizing the soluble ink. Note that in the schematic side view of FIG. 1A and of subsequent side views, there are vertical spaces between the layers as illustrated; however, in actuality, these layers are exploded apart and are directly stacked upon on another.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements.

In places where ranges of values are given, this disclosure explicitly contemplates other combinations of the lower and upper limits of those ranges that are not explicitly recited. For example, recitation of a value between 1 and 10 or between 2 and 9 also contemplates a value between 1 and 9 or between 2 and 10. Ranges identified as being "between" two values are inclusive of the end-point values. For example, recitation of a value between 1 and 10 includes the values 1 and 10.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

Definitions

As used herein, the terms "length," "width," and "height" (or "thickness") are used to describe the dimensions of the band. As the bands are generally elongate in form, "length" refers to the longer dimension on the generally planar faces of the band, while "width" is used to describe the shorter dimension on the generally planar faces. "Height" or "thickness" refers to the dimension between the generally planar faces on opposing sides of the band and is effectively the dimension of the stacked layers.

As used herein, the terms "top surface" and "bottom surface" of the band refer to a planes or sides of the band that define the major faces of the band when the band is laid flat as a strip. As used herein, the terms "top surface" and "bottom surface" may be interchangeable and can be context dependent, for example depending on the orientation of the object to which the terms refer. However, in many instances, when the band is formed into a loop, the top surface will become the generally radially outward facing surface and the bottom surface will become the generally radially inward facing surface.

As used herein, the term "longitudinal direction" refers to a direction along the length dimension and the term "lateral edges" or "lateral sides" refer to the pair of generally longer sides on each of the sides of the width. As used herein, the term "horizontal edges" or "horizontal ends" refers to sides or edge of the major faces having the shorter ends, with the horizontal ends generally including a head end and a tail end that are wrapped back onto one another to form a loop.

As used herein, the terms "overlapped portion" and "overlapping portion" refer to the portion(s) of a band that comprise at least two parts, portions, or components of said band overlapping each other with at least one surface from each overlapping part, portion or component contacting at least one surface from the other overlapping part, portion, or component. Unless otherwise stated, the amount of an overlapping portion(s) of a band are defined in terms of the length of the band along which they run.

As used herein, the term "coact" refers to an interaction between at least two objects or compositions, particularly chemical compositions, that has some property or affect which none of the compositions could create individually. As used herein, a coaction between two (or more) compositions could be a chemical reaction. As used herein, a coaction between two (or more) compositions could be one composition dissolving in another composition.

As used herein, the terms "expiration zone", "expiring zone", "expiration portion", and "expiring portion" refer to areas within an overlapped or overlapping portion of a band where a first chemical compound and a second chemical compound contact each other and coact to form a visibly perceivable change on the top surface of the band.

Time-Expiring Band Structures

The disclosed self-expiring identification bands are capable of self-expiring after a pre-determined amount of time from an activation event via a chemical interaction between at least a first chemical compound and at least a second chemical compound that results in a visibly perceptible change on the top surface of the band.

Such bands can take one of a variety of forms that are conceptually described below. After this conceptual explanation, some detail regarding the materials and components are provided, followed by specific examples providing exemplary embodiments incorporating one or more aspects of the general concepts.

At the highest level of understanding, the bands disclosed herein marry the concept of identification bands with expiration-indication. Such bands are typically elongated bodies including a facestock layer. The band itself carries at least one chemical composition that is contactable with another chemical composition to create visual indication of expiration after a period of time has elapsed.

In many forms, the band will carry both chemical compositions. Those compositions may be placed, for example, in regions that will contact one another during the forming of a loop from the band such as between an adhesive end for attachment and a surface onto which that adhesive end will be affixed. In this way, activation can be made contemporaneous with attachment.

Alternatively, it is contemplated that a non-loop forming attachment location may provide basis for creating the visual indication of expiration. For example, a projection or tab on an edge of the band may be folded onto the band to initiate the reaction with the chemical compositions being on the tab and on the surface onto which the tab is subsequently folded. Still further, it is contemplated the tab could be separable from band and/or a separately adhered sticker. In these various ways, the visual indication of expiration could be made independent of the loop-forming attachment mechanism of the band.

Such bands may include the aforementioned facestock layer and the chemical compositions and may include a release liner, a timing layer in which one of the chemical compositions may be disposed, and/or an enhancement layer. These components of the band are now described in further detail before providing some specific examples and embodiments including such constituent components.

Facestock

The facestock serves as the substrate of the bands. The facestock has a top surface and a bottom surface and is elongated in the longitudinal direction between a head end and a tail end. When head end and the tail end are brought together and joined, the facestock can form a band.

The facestock may be made from any suitable material including, but not limited to, direct thermal film, direct thermal paper, ink jet printable nonwovens (e.g., Tyvek), thermal transfer printable materials, and plastic or polymer films such as polypropylene (PP), polyester (PET), and so forth.

The facestock may have multiple sections or tabs. For example, over its longitudinal length, the band may have some sections of greater width than other sections to support the printing of indicia or text or for the attachment of an adhesive label. In some embodiments, the facestock can have one or foldable tab that are involved in the activation. Still further and in some embodiments, there may be a section or tab that is detachable from the facestock by, for example, tearing at a perforation.

In addition to being self-expiring, embodiments may be capable of bearing indicia of identification and/or other information. Information that may be added include, but is not limited to, letters, numerals, words, symbols, barcodes, and combinations thereof. This information may be added to a surface of the band or, more specifically, to a surface of the facestock or a layer further supported by the facestock. Thus, it is contemplated that either the facestock itself or a layer attached thereto can be print-receptive and made from a print-receptive material.

Indicia or information could be added to a surface of the band via any suitable method. Suitable methods include, but are not limited to, handwriting, machine printing, stamping, engraving, carving, etching, heat transfer, and so forth. In one particularly advantageous form, indicia or information may be added to a surface of the band by machine printing such as by a printer. If the band itself is machine printable, this provides great advantage in that it can prevent the need to separately print and attach, for example, a printed adhesive label bearing the indicia or information. For the sake of clarity, even if newly contemplated band is printed, it would still be two steps—first print and then attach. This can provide the advantage that on-demand information can be printed at the point of attachment (for example, date of birth, identifying information, barcodes, and so forth that are specific to the wearer, site, time, and so forth).

Chemical Compositions

The band itself and/or items attached to the band for activation can include or support two chemical compositions which are initially separate and then contactable to activate the band. It is contemplated that the first chemical composition may be an ink and that the second chemical composition is able to solubilize, at least partially the ink.

One workable ink is, for instance, Disperse Red 60 or any other disperse dyes from the anthraquinone dye family intended for use in hydrophobic compositions, suspensions and dispersions. For example, Pyro Script sublimation inks, or disperse red inks or pigments from the Pylam Products Company, Inc. (2175 E. Cedar St., Tempe, Ariz. 85281), or Subli red 770 from Sensient Colors Inc. are also workable. Other inks are certainly contemplated as being workable as well, and these are provided only by way of example.

If a solubilizable ink is the first chemical composition, then the second chemical composition can be an adhesive that is able to solubilize the ink. As one example, this second composition may come in the form of a pressure sensitive adhesive. As this second chemical composition may be in the form of an adhesive, it is worth again impressing that this second chemical composition, in addition to coacting with the first chemical composition to visually indicate that a predetermined amount of time has passed since contacting them, can provide the added benefit of being used to close the band. The second chemical composition may also be a mixture or a blend that includes an adhesive. For example, the second composition may be a mixture or a blend of a pressure sensitive adhesive, a plasticizer, and a pigment adhesive. In one workable form, the second chemical composition may include a pressure sensitive adhesive such as AROSET® PS6393, a plasticizer such as PLASTHALL® 7050 and a pigment adhesive like TINT-AYD ST 8003 titanium dioxide dispersion. In one form, the second chemical composition may comprise from 40 to 60 wt % of the pressure sensitive adhesive, from 5 to 15 wt % of the plasticizer, and from 30 to 50 wt % of the pigment adhesive.

The first chemical composition and the second chemical composition are disposed to be contactable with one another for activation; however, the particular form and locations of these compositions may vary. For example, the first chemical composition may be disposed on the top surface of the facestock and the second chemical composition may be disposed on the bottom surface of the facestock such that, when a loop is formed from the band in which the top surface and the bottom surface contact one another, the two chemical compositions come into contact with one another. Alternatively, the first chemical composition and the second chemical composition may be on the same side (e.g., the top surface or the bottom surface) of the facestock, but discretely separated from each other initially. Then, the facestock may be folded onto itself to contact the chemical compositions with one another. Still further, it is contemplated that one of the chemical compositions may be on the facestock while a sticker or tag may contain the other of the chemical compositions. In this case, the sticker or tag may be attached to the facestock to bring the two chemical compositions together.

While an ink and ink-solubilizing composition have been described in which their coaction results in a visually perceivable color change after a predetermined time interval; the chemicals are not so limited and it is contemplated that other chemicals and modes of reaction could be employed to similar effect. For example, dye-based time indicating ink systems such as those described in U.S. Pat. No. 9,958,936 which issued on May 1, 2018, which is incorporated by references for all purposes as if set forth herein, could be used in such bands even though in that patent they are described as being applicable to labels. Moreover, they may masking (e.g., a black mask layer at which the soluble ink is disposed to hide its initial migration, as is generally depicted in the examples) or enhancement or timing layers to provide better performance and/or presentation.

Release Liner

A release liner is a layer that may be readily removed, at least in part, by a user, for example, to reveal an underlying adhesive. A release liner may be made of any suitable material including, but are not limited to glassine paper liner, SCK liner or polymer film (PP, PET, and so forth) liner.

Some forms of the band may include one or more release liners including, potentially, segmented release liners. For example, a release liner may be disposed on top of the first and/or second chemical composition in order to protect it from contamination or activation. Most commonly, a release liner will be disposed on top of an adhesive.

Various release liner configurations and structures could be employed. For example, it is contemplated that one or more release liners could be present on the top and/or bottom surface of the facestock. Still further, depending on the use case, the release liner (or segments thereof) may cover portions or all of the length of the surface of the facestock on which it is disposed.

In some forms of the disclosed band, the entire release liner may be removable or only portions thereof. If only part of the release liner is removable, then a score line may separate the portion of the release liner that is readily removable by a user from the portion that is not. In cases where the release liner is segmented, there may be multiple scope lines to demarcate and separate these sections.

Timing Layer

Some embodiments of the band may comprise a timing layer. A timing layer affects how long a band will take to expire. The timing layer may be configured such that the embodiment will expire after any desired pre-determined amount of time, for example 1 hour, 3 hours, 6 hours, 12 hours, 18 hours, 24 hours, and so forth.

A timing layer may be configured such that the entire band expires at a single pre-determined amount of time. Alternatively, a timing layer may be configured such that portions of the band may each expire at different pre-determined amounts of time. For example, a first section may expire after one hour, a second section may expire after three hours, and third section may expire after three hours, even when the first, second, and third sections are all disposed on the same self-expiring band.

The timing layer may be disposed on a surface of the facestock. The timing layer may be combined with the adhesive or may be separate from, but adjacent to, the adhesive.

Enhancement Layer

Some embodiments of the disclosed band may comprise an enhancement layer. The enhancement layer may make the visually perceptible change that occurs on the top surface of the band upon its expiration appear brighter, clearer, and/or more defined. The enhancement layer may be disposed along all or less than all of a length of the surface of the facestock on which it is disposed.

An enhancement layer may be made from any suitable material including, but are not limited to, a blend of a pressure sensitive adhesive such (92.5%) and a plasticizer (7.5%) in which the blend comprises from 80 to 97.5 wt % of a pressure sensitive adhesive and from 2.5 to 20 wt % of a plasticizer. One example of the pressure sensitive adhesive is Aroset PS6393 and one example of the plasticizer is Plasthall 7050. The plasticizer should be compatible with and able to solubilize the first chemical composition which is a soluble ink.

Expiration Zones

After the chemical compositions are brought into contact with one another, they coact to present a visual indication of expiration in one or more expiration zones on the band. The positioning and extent of such expiration zone bears significance as they help to provide a quick visual indication that the band has expired. In contrast, the current state of the art bands may often require close inspection of indicia to confirm expiration or are not "dynamic" in that they do not have a first visible appearance when valid or non-expired and a second visible appearance when invalid or expired.

Notably, the bands described herein provide one or more expiration zone that is or are designed to be readily viewable, even from a distance. To enhance such viewability, the structure of the band may be altered to in turn impact the placement of the expiration zone or zones on the band.

For example, in some forms, the first and second chemical compositions each may run at least one third of the overall length on opposing ends of the band before being contacted with one another during the formation of a loop to activate the band. In this way or in other ways, there could readily be 50% or more of the periphery of the formed loop of the band that can be activated and form an expiration zone. By having 50% or more of the looped band periphery serve as an expiration zone, a third party viewing the band should be able to see expiration from nearly any angle, since a portion of the expiration zone should fall within the visible field. However, increasing this amount beyond 50% of the periphery can still further enhance viewability. For example, the self-expiring identification band could also have an expiration zone that runs along at least 60%, 70%, 80%, 90%, or the entirety of the length of the periphery of the looped/overlapped band.

In some forms, the first chemical composition and the second chemical composition may be disposed such that the self-expiring identification band form multiple, non-contiguous expiration zones about the periphery of the looped band. In this way, the expiration of the band might be made to see from a wider range of angles and viewpoints, without requiring that the expiration zone exists over the entire 360 degrees of the looped band. For example, in one form of this non-contiguous expiration zone design, the first chemical composition and second chemical composition may be arranged such that none of the gaps between the expiration zones runs along more than 90 degrees, 80 degrees, 70 degrees, 60 degrees, 50 degrees, 40 degrees, 30 degrees, 20 degrees, or 10 degrees of the looped band. Even in this non-contiguous design, it would be difficult for a wearer to hide and easy for an inspector to visually detect expiration. Still further, using non-continuous areas permits a reduction in the overall amount of the chemicals required to provide a visual indication over some or all of the periphery and the lengths and positons of the chemicals may be geometrically selected to ensure that at least some overlap occurs.

Beneficially, when the expiration zones are viewable over the range of the periphery of the formed loop and there are gaps between the expiration zones, those gaps may be well suited for printing of indicia or information.

In versions of the band with the foldable tab for activation, the tab can likewise have a length of sufficient to achieve the above-mentioned range of viewability. Still further, the tab might be foldable onto a side that will become the inner radial surface of the loop and therefore leave one side of the facestock available for printing which will subsequently indicate as expired.

Still further, in embodiments in which an activating adhesive article or sticker, the use of the adhesive article or sticker allows easy customization of the band by a user in regards to where the overlapped portion and/or the expiration zone will be located along the length of the band.

Methods of Use

As mentioned throughout, the band is activated by manipulating component(s) of a band such that a first chemical compound and a second chemical compound, both disposed thereon, come in contact with each other. A predetermined amount of time passes before the coaction of the first chemical composition and the second chemical composition causes a visibly perceptible change on the top surface of the band. Once the coaction between the first chemical composition and the second chemical composition is complete, such that there is a visibly perceptible change on the top surface of the band, the band has self-expired.

In some forms or use cases, even before activation or forming a loop, indicia and/or other information may be printed on the band while the band is still in a flat form. In some forms, the indicia and/or other information may be handwritten on the surface of the band, machine printed on the surface of the band, stamped on the surface of the band, or added by other suitable means.

Then after any printing is completed, the band may be looped and activated, which may be one in the same or different actions. For at least the activation step, the manipulations initially placing the first chemical composition and the second chemical composition in contact with each other may differ between different forms of the band. First, in bands (or associated stickers) in which a release liner covers one or both of the chemical compositions, at least a portion of or all of the release liner is first removed to expose one or more of the chemical components so they can be contacted with the other. With the chemical components exposed, the band can potentially be overlapped, folded, or moved, or a sticker applied, in order to bring the chemical components together to activate the band.

EXAMPLES

Below are examples of specific embodiments for carrying out the present invention. The examples are offered for illustrative purposes only, and are not intended to limit the scope of the present invention in any way.

Whether so illustrated or not, each are formable into a loop so as to be attachable, for example, around a wrist.

Example 1

FIGS. 1A-D show a first example of a band with a soluble ink on top surface of a facestock of the band and an exposable adhesive on the bottom surface with a composition that is capable of solubizing the soluble ink when formed into a loop.

Figure 1B:
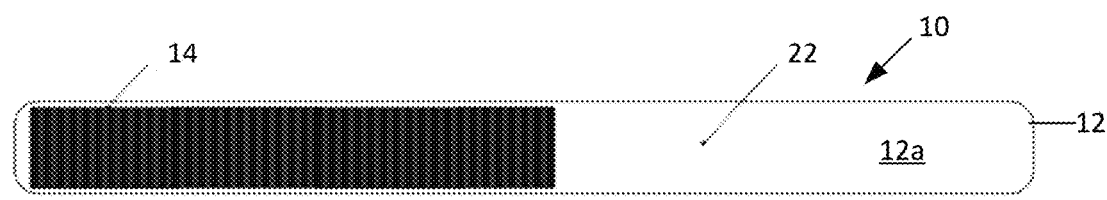

Looking first at FIGS. 1A and 1B, a self-expiring identification band 10 has a facestock 12 with a top surface 12a and a bottom surface 12b. A first chemical composition 14 that is a soluble ink is disposed on the top surface 12a of the facestock 12 and a second chemical composition 16 that is an adhesive is disposed on the bottom surface 12b of the facestock 12. Additionally, a release liner 18 is disposed on the bottom surface 12b of the facestock 12 such that the release liner 18 initially covers and overlaps the second chemical composition 16. The release liner 18 has a score line 20 that spans the width of the band 10. Both the first chemical composition 14 and the second chemical composition 16 are disposed on their respective surfaces of the facestock 12 such that they run along at least one third of the length or more of their respective surfaces of the facestock 12.

As best illustrated in FIG. 1B, the first chemical composition 14 is only disposed on a portion of the top surface 12a of the facestock 12. The remainder of the top surface 12a of the facestock 12 is void of the first chemical composition and can serve as a printable area 22. The printable area 22 is a portion of a surface of the facestock 12 (or band 10) on which information, such as indicia of identification, may be added. This information may be added by any suitable method, including handwriting, machine printing, and stamping. This information may include, but is not limited to, letters, words, symbols, drawings, colors, and mixtures therefore.

Figure 1C:
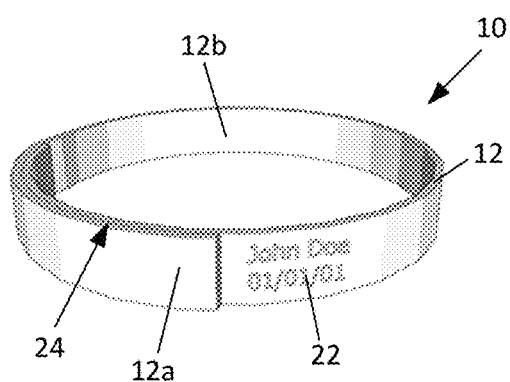
FIGS. 1C-1D are views of the first embodiment of FIGS. 1A-1B in which the band has been formed into a loop, before and after it expires.
Figure 1D:
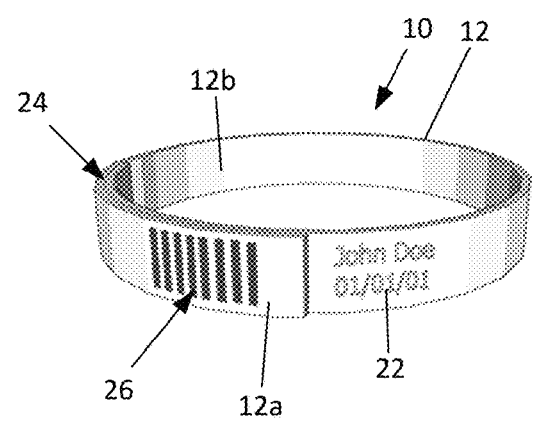

Turning now to FIGS. 1C and 1D, these figures respectively show the band 10 formed into a loop to initiate activation and to show expiration.

To form the loop illustrated in FIG. 1C, at least a portion of the release liner 18 has been removed and the ends of facestock 12 have been manipulated such that they overlap each other, placing the self-expiring identification band 10 into a looped formation. When the self-expiring band 10 is in a looped formation, the facestock 12 has an overlapped portion 24 in which the top surface 12a of the facestock 12 contacts the bottom surface 12b of the facestock 12. In at least part of this overlapped portion 24, the first chemical composition 14 that is a soluble ink disposed on the top surface 12a of the facestock 12 contacts the second chemical composition 16 that is an adhesive disposed on the bottom surface 12b of the facestock 12. The first and second chemical compositions coact in these areas to form expiration zones, which after they develop are shown in FIG. 1D.

Turning now to FIG. 1D, FIG. 1D shows the expiration zone 26 within the overlapped portion 24, in which the first chemical composition 14 and second chemical composition 16 have coacted to produce a visibly perceptible change on the surface of the top surface 12a of the facestock 12. The visually perceptible change may be a color change and may form a pattern (for example, the vertical-oriented red stripes as shown in FIG. 1D).

At least a portion of the top surface 12a or the facestock 12 does not bear an expiration zone 26, but rather is a printable area 22 which in FIGS. 1C and 1D was printed upon prior to forming the loop. In the illustrated example, the printable area 22 bears indicia including a name ("John Doe") and a date ("Jan. 1, 2001"), but this could be any of the various kinds of indicia or information described elsewhere in this application and may be, for example, machine printed, an applied label, and/or handwritten.

Example 2

Figure 2A:
FIGS. 2A-2B are a schematic side and bottom view, respectively, of a second embodiment of a band that is otherwise similar to the first embodiment of FIGS. 1A-1D, except that there are multiple release tabs over the adhesive instead of just one.
Figure 2B:
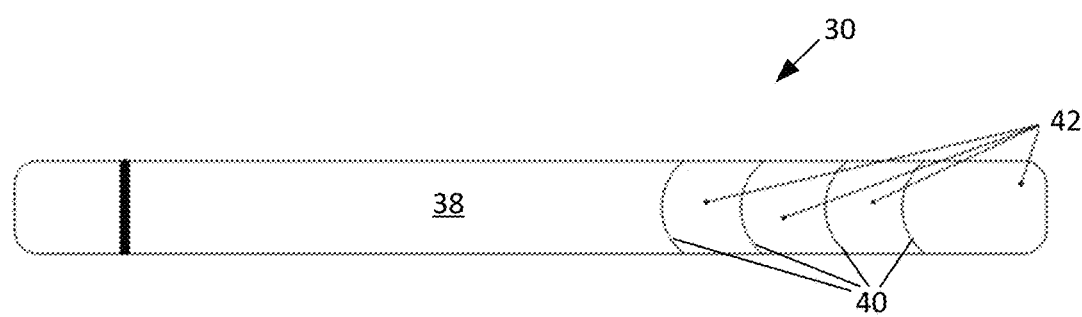

FIGS. 2A-2B are a second example of a band 30 that is otherwise similar to the band 10 of the first example of FIGS. 1A-1D, except that there are multiple release tabs covering the adhesive instead of just one.

Looking first at FIG. 2A, a self-expiring identification band 30 again has facestock 32 with a top surface 32a and a bottom surface 32b. A first chemical composition 34 that is a soluble ink is disposed on the top surface 32a of the facestock 32 and a second chemical composition 36 that is an adhesive is disposed on the bottom surface 32b of the facestock 32.

Also a release liner 38 disposed on the bottom surface 32b of the facestock 32 such that it initially covers and overlaps the second chemical composition 36. Unlike the first example, the release liner 38 has multiple scores lines 40. The multiple score line 40 form multiple release tabs 42 in the release liner 38 as best shown in FIG. 2B. The multiple release tabs 42 allow a user to manipulate the self-expiring identification band 30 by removing any one (or more) of the release tabs 42. As with the first example, once the adhesive is removed, the flat strip of the band 30 can be formed into a loop similar to the one depicted in FIGS. 1C-1D.

One benefit of conferred by the multiple release tabs 42 is that the self-expiring identification band 30 can be easily adjusted by a user, such that it can wrap around objects of varying sizes and subsequently adhere to itself, in order to remain in a looped/overlapped formation and maximize the amount of contact between the second chemical composition 36 in the adhesive with the first chemical composition 34 on the top surface 32a of the facestock 32.

Example 3

Figure 3A:
FIGS. 3A-3B are a schematic side and bottom views, respectively, of a third embodiment of a band that is otherwise similar to the first embodiment of FIGS. 1A-1D, except that there is a release coating disposed between a covering film and the facestock.
Figure 3B:
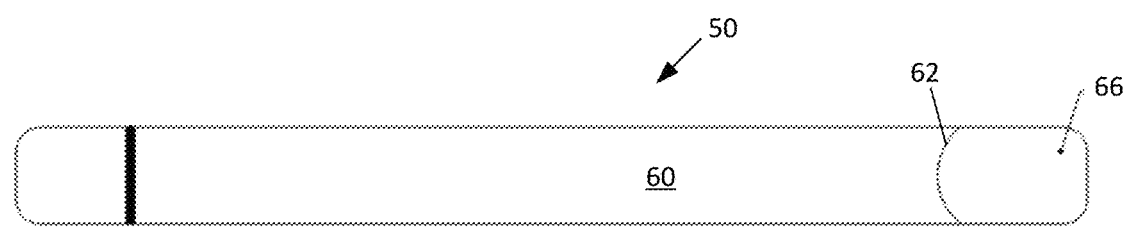

FIGS. 3A-3B show a third example of a band that is similar to the first embodiment of FIGS. 1A-1D, except that there is a release coating disposed between a covering film and the facestock. While the release coating permits the separation of a portion of the covering film, the covering film is permanently adhered to the adhesive and facestock in the area outside of the release coating.

Looking at FIGS. 3A-3B, a self-expiring identification band 50 has a facestock 52 with a top surface 52a and a bottom surface 52b. A first chemical composition 54 that is a soluble ink is disposed on the top surface 52a of the facestock 52 and a second chemical composition 56 that is an adhesive is disposed on the bottom surface 52b of the facestock 52.

In this example, a covering film 60 is disposed on the bottom surface 52b of the facestock 52 over the adhesive such that the covering film 60 covers and overlaps the second chemical composition 56. The covering film 60 may be, for example, a plastic film or paper. Similar to the aforementioned release liners from the first two examples, the covering film 60 has a score line 62 with the area to the right of the score line (as best depicted in FIG. 3A) being a covering film tab 66 that is removable to expose the underlying adhesive.

To accommodate this removability of the covering film tab 66, the self-expiring identification band 50 also has a release coating 64 disposed between the second chemical composition 56/adhesive and the covering film 60 in an area from the rightmost portion of the band 50 between the rightmost end of the band 50 that is proximate to the score line 62 and the score line 62 itself. This release coating 64 allows a user to remove the covering film 60 only from the area of that end up to where the score line 62 is located (that is, an area roughly corresponding to the covering film tab 66). In the remainder of the interface between the covering film 60 and the adhesive, the covering film 60 will permanently bond to the second chemical composition 56 and the facestock 52 in the other area leading from the score line 52 to the opposite side of the band 50.

With this design, the user is only able to remove a portion of the covering film 60 instead of there being the possibility of removing the entire release liner as in the earlier examples when removing the covering film tab 66 in anticipation of forming a loop for securement and activation.

Example 4

FIGS. 4A-4D show a fourth example of a band that is similar to the first embodiment of FIGS. 1A-1D except that, instead of a large patch of soluble ink covering half of the top surface as in the first example, the soluble ink in this fourth example is disposed only near the lateral edges of the facestock with the center portion of the facestock between the lateral edges being void of the soluble ink.

Looking at FIGS. 4A-4D, a self-expiring identification band 70 has a facestock 72 with a top surface 72a and a bottom surface 72b. A first chemical composition 74 that is a soluble ink is disposed on the top surface 72a of the facestock 72 and a second chemical composition 76 that is an adhesive is disposed on the bottom surface 72b of the facestock 72. As with the first two examples, a release liner 78 is disposed on the bottom surface 72b of the facestock 12 such that the release liner 78 initially covers and overlaps the second chemical composition 76. The release liner 78 has a score line 80 to segment the liner 78. As illustrated, both the first chemical composition 74 and the second chemical composition 76 are disposed on their respective surfaces of the facestock 72 such that they run along at least one-third of the length of their respective surface of the facestock 72 and, more preferably one half or the entirety of the length of the band 70.

Figure 4A:
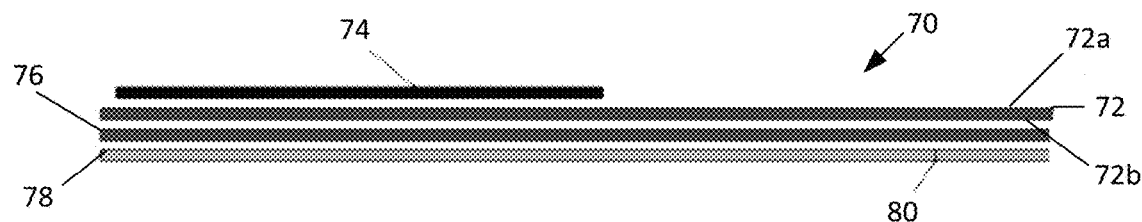
FIGS. 4A-4B are a schematic side and top view, respectively, of a fourth embodiment of a band that is otherwise similar to the first embodiment of FIGS. 1A-1D, except that a soluble ink is disposed only near the lateral edges of the facestock, while the center portion of the facestock between the lateral edges is void of the soluble ink.
Figure 4B:
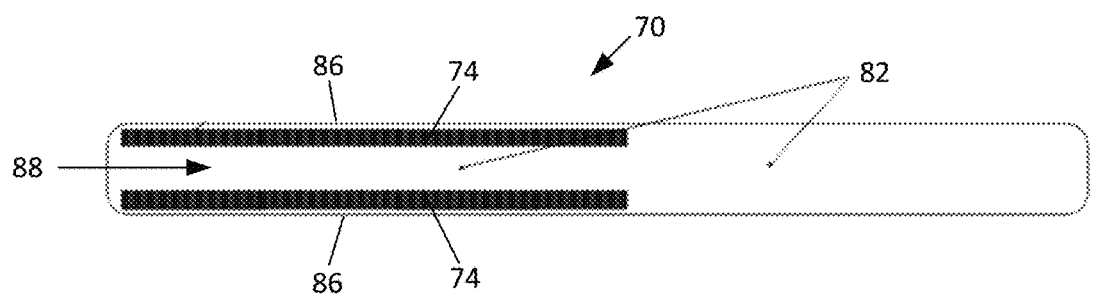

As best illustrated in FIG. 4B, the first chemical composition 74 is disposed proximate the lateral edges 86 of the facestock 72, with a center portion 88 of the top surface 72a of the facestock 72 therebetween being void of the first chemical composition 74. As such, both the center portion 88 of the top surface 72a of the facestock 72 which is void of the first chemical composition 74 and the portion of the top surface 72a of the facestock 72 along which the first chemical composition is not disposed are potentially printable areas 82.

Figure 4C:
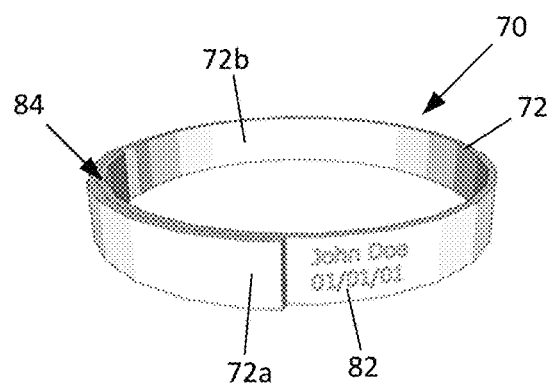
FIGS. 4C-4D are views of the fourth embodiment of FIGS. 4A-4B in which the band has been formed into a loop, before and after it expires.

FIG. 4C shows the band 70 in a looped/overlapped formation, after activation, but before it expires. As illustrated, information has been also printed (prior to activation) in the printable areas 82. To form the loop from the band 70, a portion of the release liner 78 has been removed and the ends of facestock 72 have been manipulated such that they overlap each other in an overlapped portion 84 in which the top surface 72a of the facestock 72 contacts the bottom surface 72b of the facestock 72. In at least part of the overlapped portion 84, the first chemical composition 74 that is the soluble ink disposed on the top surface 72a of the facestock 72 contacts the second chemical composition 76 that is an adhesive disposed on the bottom surface 72b of the facestock 72. The first chemical composition 74 and the second chemical composition 76 coact in these areas to form expiration zones 90, as subsequently shown in FIG. 4D, in which there is a visibly perceptible change (e.g., a color change) on the surface of the band 70.

Figure 4D:
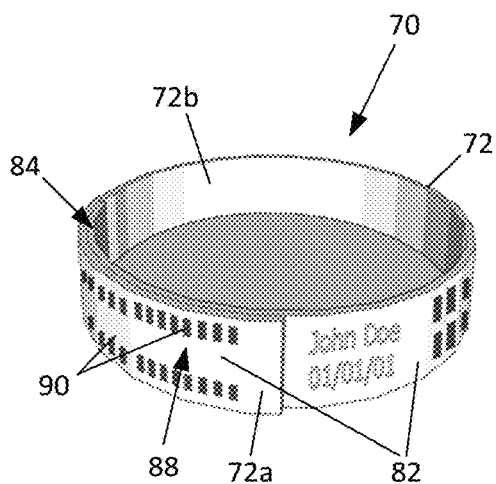

FIG. 4D shows the embodiment of FIGS. 4A-4C, in a looped/overlapped formation, after expiration has occurred. FIG. 4D shows the expiration zones 90, in which the first chemical composition 74 and second chemical composition 76 have coacted in the overlapped portion 86 to produce a visibly perceptible change on the surface of the top surface 72a of the facestock 72 in the overlapped portion 86. Because the first chemical composition 74 extends longitudinally along the lateral sides of the width of the band 70 with no first chemical composition between those sides, the expiration zones 90 have a corresponding pattern that is also laterally disposed in two rows as illustrated.

Beneficially, the embodiment shown in FIG. 4A-4D allows for expiration zones 90 and for the printable area 82 to run simultaneously along the greater lengths of the band, providing an excellent combination and balance between the amount of information that may be printed on a band and the visibility of an expired expiration zone. Still further, this design can reduce the amount of ink used as the first chemical component used while maintaining the longitudinal length over which the expiration zones 90 extend, because less of the width of the band 70 is covered by the ink (i.e., just the near the lateral sides or edges 86).

Example 5

FIGS. 5A-5D show a fifth embodiment of a band that is otherwise similar to the first embodiment of FIGS. 1A-1D, except that part of the facestock (i.e., a tail end) is tapered such that it can fit through a slit cut into the facestock (at the head end).

Looking at FIGS. 5A-5D, a self-expiring identification band 110 has facestock 112 with a top surface 112a and a bottom surface 112b. A first chemical composition 114 that is a soluble ink is disposed on the top surface 112a of the facestock 112 and a second chemical composition 116 that is an adhesive is disposed on the bottom surface 112b of the facestock 112. A release liner 118 is disposed on the bottom surface 112b of the facestock 112 such that it initially covers and overlaps the second chemical composition 116. The release liner 118 has a score line 120 to segment the liner 118.

Figure 5A:
FIGS. 5A-5B are a schematic side and top view, respectively, of a fifth embodiment of a band that is otherwise similar to the first embodiment of FIGS. 1A-1D, except that part of the facestock is tapered such that it can fit through a slit cut into the facestock.
Figure 5B:
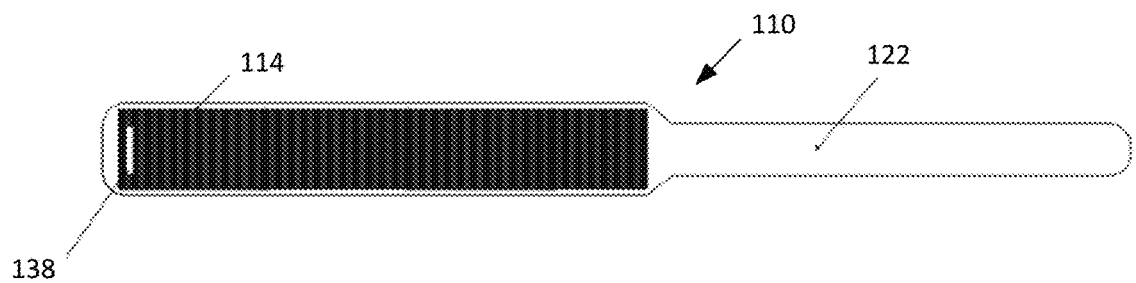

As best shown in FIG. 5B, the band 110 is divided into two portions, a tail portion and a head portion. As illustrated the first chemical composition 114 substantially covers the top surface 112a of the facestock 112 in the head portion, and the tail portion is substantially bear, providing a printable surface 122.

The tail portion of the facestock 112 is tapered relative to the head portion such that the tail portion has a smaller width. In some embodiments, the tail portion of the facestock 112 may have a width that is at least 30% less than the maximum width of the head portion of the facestock 112. However, in other embodiments, the width of the tail portion of the facestock 112 may be 30%, 40%, 50%, 60%, 70%, 80%, or 90% less than the maximum width of the head end of the facestock 112.

The head portion of facestock 112 at the end furthest from the tail end has a slit 138 extending widthwise cut centrally through it. The slit 138 has a width that is at least equal to the width of the tail portion of the facestock 112 such that the tail portion can be received through the slit 138 to create a loop.

Figure 5C:
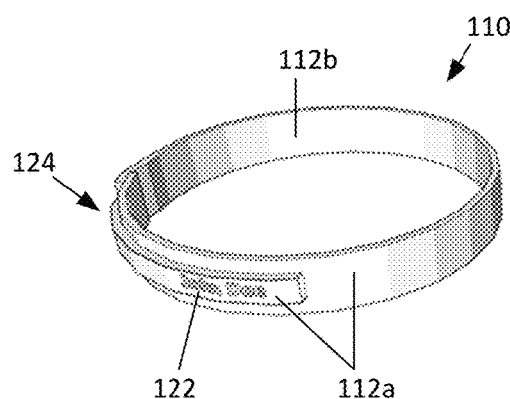
FIGS. 5C-5D are views of the fifth embodiment in which the band has been formed into a loop, before and after it expires.

FIG. 5C shows the band 110 in a looped/overlapped formation with the tail portion being pulled through the slit 138 and attached to the top surface 112a of the head portion of band 110 (after the release liner 120 is removed from at least a portion thereof), to activate the band 110, but before the band 110 expires. When the self-expiring band 110 is in a looped formation, the facestock 112 has an overlapped portion 124 in which the top surface 112a of the facestock 112 on the head portion contacts the bottom surface 112b of the facestock 112 of the tail portion. In at least part of the overlapped portion 124, the first chemical composition 114 that is a soluble ink disposed on the top surface 112a of the facestock contacts the second chemical composition 116 that is an adhesive disposed on the bottom surface 112b of the facestock 112. The first chemical composition 114 and the second chemical composition 116 coact in these areas to form expiration zones 126 as shown in FIG. 5D, in which there is a visibly perceptible change on the surface of the band 110 over time.

Figure 5D:
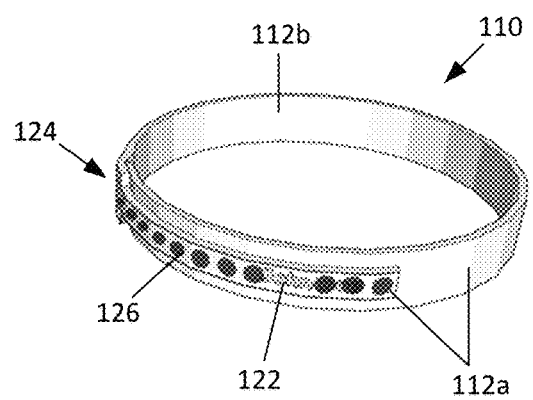

FIG. 5D shows the band of FIG. 5C, after it has passed expiration. FIG. 5D shows the expiration zones 126, in which the first chemical composition 114 and second chemical composition 116 have coacted to produce a visibly perceptible change on the surface of the top surface 112a of the facestock 112 in the form of a repeating set of circles along with the color change. As illustrated, a portion of the length of the top surface 112a or the facestock 112 does not bear an expiration zone 126, but rather is a printable area 122. As illustrated, this printable area 122 may be on a portion of the surface of the tail portion and may not have an expiration zone coincident with it.

Example 6

FIGS. 6A-6D shows a sixth embodiment of a band that is similar to the first embodiment of FIGS. 1A-1D, except that the ink is disposed on multiple, noncontiguous portions of the facestock over the length of the band.

In FIGS. 6A-6D, a self-expiring identification band 150 having facestock 152 with a top surface 152a and a bottom surface 152b. A first chemical composition 154 that is a soluble ink is disposed on the top surface 152a of the facestock 152 and a second chemical composition 156 that is an adhesive is disposed on the bottom surface 152b of the facestock 152. A release liner 158 is disposed on the bottom surface 152b of the facestock 152 such that the release liner 158 initially covers and overlaps the second chemical composition 156. The release liner 158 has a score line 160 to segment the liner 158.

Notably, this example is unique from the first example in that the first chemical composition 154 is disposed on multiple, noncontiguous portions of the top surface 152a of the facestock 152 spaced out over the length dimension. These portions of the top surface 152a of the facestock 152 are separated from each other by portions of the top surface 152a of the facestock 152 that do not bear the first chemical composition 154, labelled as bare portions 164. In some embodiments, the first chemical composition 154 may be disposed on 2, 3, 4, 5, 10, 20 or more noncontiguous portions of the top surface 152a of the facestock 152. Moreover, it is contemplated that—and as has been also depicted in various other examples—even within these non-continuous portions there could be groupings of discrete lines formed, for example by the overlaid patterns of the pair of chemical compositions.

Figure 6A:
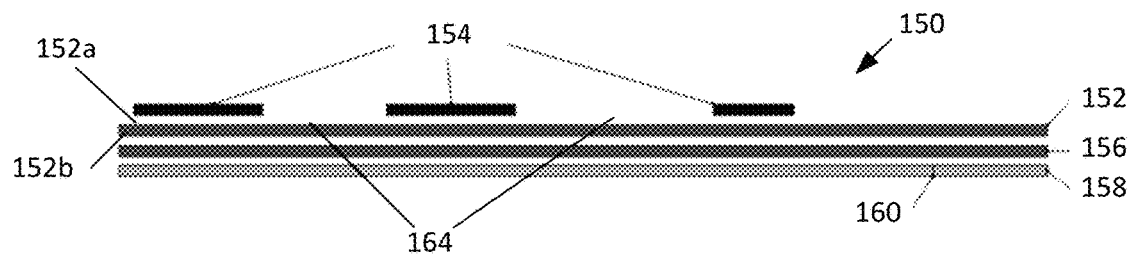
FIGS. 6A-6B are a schematic side and top view, respectively, of a sixth embodiment of a band that is otherwise similar to the first embodiment of FIGS. 1A-1D, except that the ink is disposed on multiple, noncontiguous portions of the facestock over the length of the band.
Figure 6B:
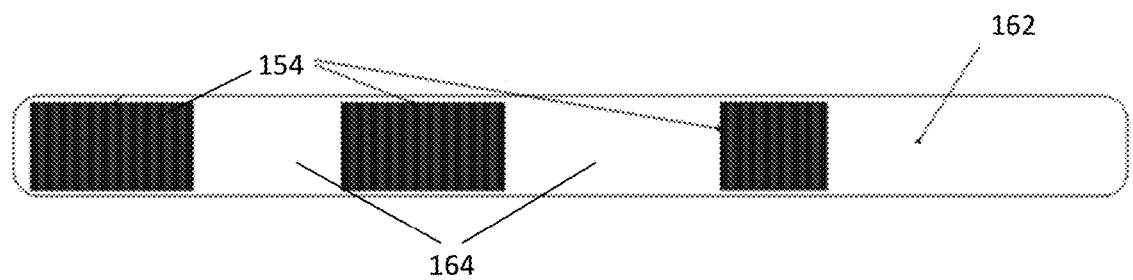
Figure 6C:
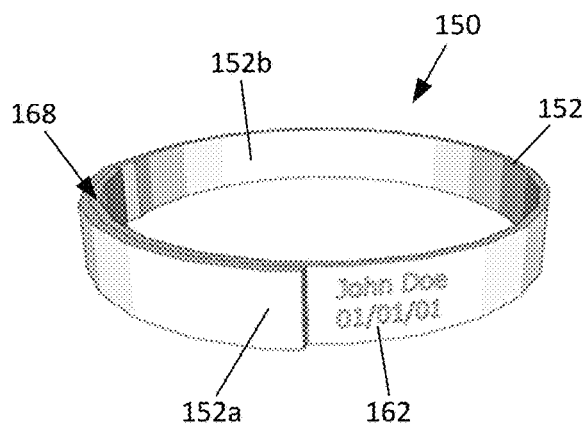
FIGS. 6C-6D are views of the sixth embodiment in which the band has been formed into a loop, before and after it expires.
Figure 6D:
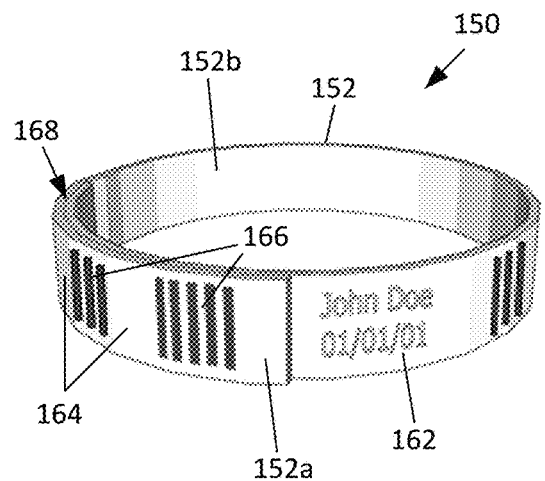

The bare portions 164 may provide part of a printable area and this an additional printable area 162 may lay beyond the spaced regions of the first chemical composition 154 as best illustrated in FIGS. 6B and 6D.

FIGS. 6C and 6D show the band 150 in looped form before and after expiration has occurred, after at least a portion of the release liner 158 has been removed and the first chemical composition 154 and the second chemical composition 156 are brought into contact with one another. Again, the folding of the band 150 onto itself to form a loop creates an overlapped portion 168 in which at least some number of non-contiguous expiration zones 166 develop and reside, having bare portions 164 therebetween, in which the expiration zone 166 generally correspond in size and spacing to the positioning of the first chemical material 154.

It is contemplated that there could be two or more noncontiguous parts of the overlapped portion 168 in which the first chemical composition 154 that is a soluble ink disposed on the top surface 152a of the facestock 152 contacts the second chemical composition 156 that is an adhesive disposed on the bottom surface 152b of the facestock 152. As illustrated, there could be three non-contiguous sections; however, the band could be designed to have any number of non-contiguous sections so long as it fits in the area.

When there are two or more non-contiguous expiration zones, it is contemplated that the largest gap between these zones might be 90 degrees or less (e.g., 80 degrees or less, 70 degrees or less, 60 degrees or less, 50 degrees or less, 40 degrees or less, 30 degrees or less, 20 degrees or less or 10 degrees or less). Such spacing means can help to ensure that from at least some angles, a visual expiration indicator is viewable if the entire circumference of the band is activated and expired. Moreover, such close spacing may help to ensure that at least some portion of the adhesive/second chemical component contacts and coacts with the first chemical component based on even a minimum amount of engagement contact, despite the spacing of the first chemical composition on the facestock.

Example 7

FIGS. 7A-7F show a seventh embodiment of a band, with a foldable tab on one of the lateral sides of the band that is folded onto the main length of the band in a clamshell style to activate the band.

Figure 7A:
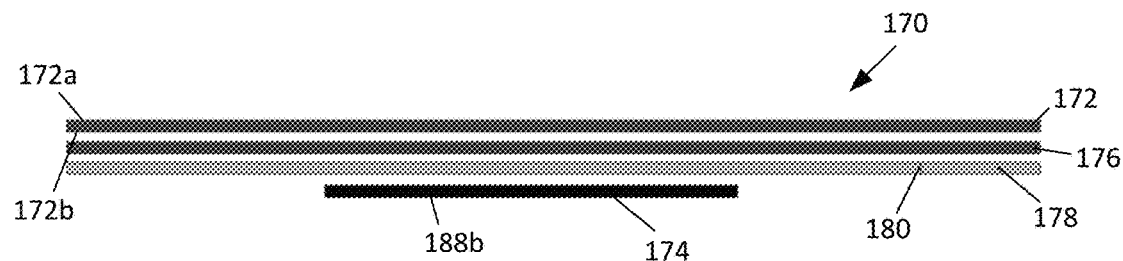
FIGS. 7A-7B are schematic side views taken along the longer and shorter dimensions, respectively, of a layer structure of a seventh embodiment of a band, with a foldable tab on a lateral side of the band that is folded to activate the band.
Figure 7B:
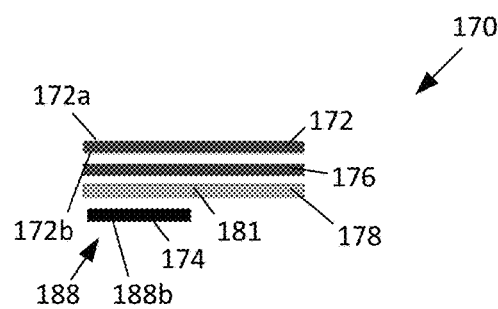
Figure 7C:
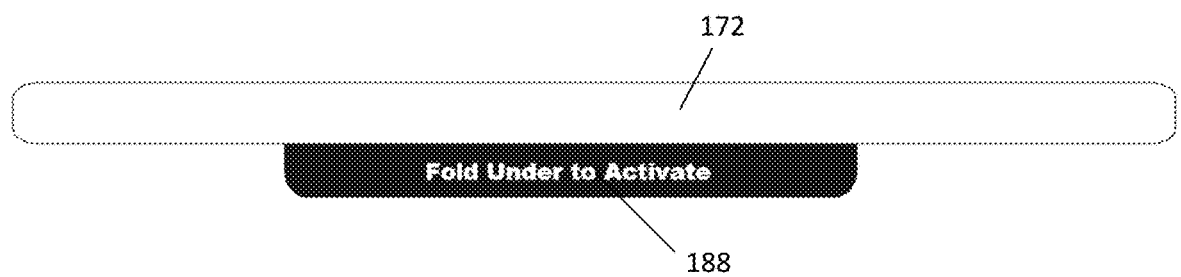
FIGS. 7C-7D are top and bottom views of the band of FIGS. 7A-7B, better showing the laterally-disposed foldable tab prior to activation by folding.
Figure 7D:

In FIGS. 7A-7F, a self-expiring identification band 170 has facestock 172 that is elongated in the longitudinal direction and further has a foldable tab 188, which is best shown in FIGS. 7C and 7D, disposed along at least part of the length of a lateral edge of the facestock 172. As with the other embodiments, the facestock 172 has a top surface 172a and a bottom surface 172b in which the bottom surface 172b had an adhesive 176 covering it and a release liner 178 covering the adhesive.

Also like the other embodiments, the self-expiring identification band 170 has a pair of coactable chemical compositions although, uniquely in this exemplary form, leverages existence of the foldable tab 188 as an activation mechanism by placement of the chemical compositions in proximity of one another at the tab 188. In this example, the self-expiring identification band 170 has a first chemical composition 174 that is a soluble ink disposed on the bottom surface 188b of the tab 188 on the side of the release liner 176 opposite the adhesive 176. The self-expiring identification band 170 also has a second chemical composition 176, which is the adhesive 176, and that is disposed on the bottom surface 172b of the facestock 172 and covered by the release liner 178. The release liner 178 has a score line 180 near one of the ends and another score line 181 that separates the portion of the release liner 178 covering the tab 188 from the portion of the release liner 178 covering the rest of the facestock 172.

Figure 7E:
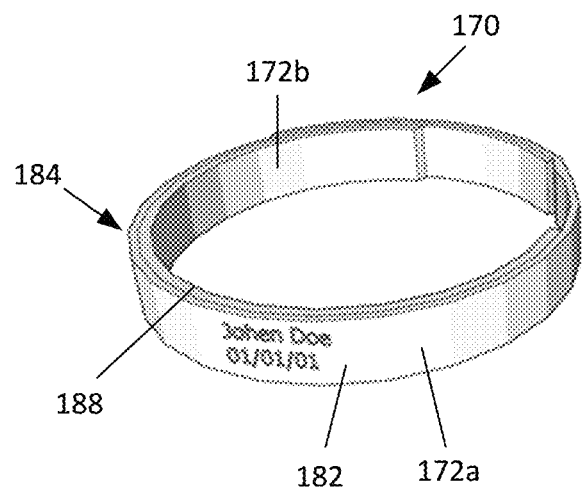
FIGS. 7E-7F are views of the seventh embodiment, after the lateral tab has been folded and in which the band has been formed into a loop before and after it expires.

The tab 188 is foldable, in that it can be folded under the rest of the facestock 172, such that the bottom surface 188b of the tab 188 contacts the bottom surface 172b of the facestock 172 after the release liner 178 has been removed, forming an overlapped portion (184, shown in FIG. 7E). Notably, while the portion of the release liner 178 over the adhesive 176 may be removed over the main section of the band 170, the score line 181 permits the portion of the release liner 178 over covering the adhesive of the tab 188 and which supports the first chemical composition 174 to remain in place on the bottom side of the tab 188. When folded, the first chemical composition 174 and the second chemical composition 176 coact when brought into contact with each other, in order to create a visibly perceptible change on the top surface 172a of the facestock 172. Areas of the top surface 172a of the facestock 172 in which a visibly perceptible change occurs are referred to herein as expiration zones 186.

As illustrated, the facestock 172 has a longer length than the tab 188. While it is a matter of degree as to what this difference may be, it is noted that for the illustrated example, having a longer length of the tab 188 (for example, exceeding on third or one half the length of the facestock 172) can be advantageous in that, when ultimately the tab 188 is folded over and a loop is formed from the band 170, the tab 188 extends a greater extent of the periphery the longer it is and is, thus, more easily viewed from various angles. That said, selecting the right the length of the tab 188 may a bit of a balancing act in that, if the tab is too long, then it may prove an impediment to forming a loop with the adhesive at the longitudinal ends of the band 170 because that adhesive may be not be available for looped securement if covered by the folded tab. Likewise, the top surface 188 of the tab 188 will then be disposed on the bottom side of the facestock 172b and can be used to substantially cover the adhesive 176 over the portions of the length it contacts, such that adhesive 176 of the band 170 does is not exposed over the length of the as-folded tab 188 and will not stick to, for example, the wearer's wrist. In this regard, the other sections of the release liner 178 may also continue to cover the some or all of the adhesive 176, even if the adhesive 176 is locally exposed in the region of the tab 188 for activation.

FIG. 7E shows the embodiment of FIGS. 7A-7D, in a looped/overlapped formation, before it expires. The self-expiring identification band 170 has had the tab 188 folded under (after removal of the liner 178 to permit contact of the chemical compositions) such that soluble ink of the tab 188 is in contact with the facestock 172. Accordingly, the first chemical composition and the second chemical composition are disposed such that they contact each other in at least part of the overlapped portion 184. Within the overlapped portion 184, where the first chemical composition 174 and the second chemical composition contact 176 contact each other, they coact, and after a predetermined amount of time, they create a visibly perceptible change on the top surface 172a of the facestock 172. Portion of the top surface 172a of the facestock 172 that bear such a visibly perceptible change are referred to as expiration zones 186, shown in FIG. 7F. It is noted that, as illustrated, there is different patterning on FIG. 7D (reading "VOID") and in FIG. 7F (having parallel lines). In actuality, the visible indication on the expiration zone should match the ink pattern; however, two slight variations are show between FIG. 7D and FIG. 7F.

As with the other embodiments, at least a portion of the top surface 172a of the facestock 172 can provide a printable area 182. In some forms, the entire top surface 172a of the facestock 172 can be a printable area 182. The printable area 182 shown in FIG. 7F bears indicia of identification, including a name (John Doe) and a date (Jan. 1, 2001). A particular advantage of this exemplary form is that the entire top surface remains available for printing, while it also can be activated by the folded tab 188 on the inner side of the loop.

Figure 7F:
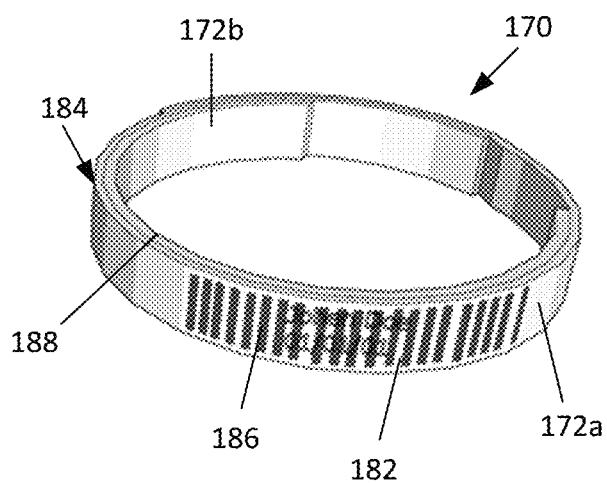

FIG. 7F shows the embodiment of FIGS. 7A-7C, in a looped/overlapped formation, after it expires. FIG. 7D shows the expiration zones 186, in which the first chemical composition 174 and second chemical composition 176 have coacted to produce a visibly perceptible change on a portion of the top surface 172a of the facestock 172. The visually perceptible change in the expiration zones 176 may be a color change. The expiration zones 176 exists within the overlapped portion 174. FIG. 7F also shows a printable area 182 on the top surface 172a of the facestock 172. As shown in FIG. 7D, it is possible for at least a portion of the top surface 172a of the facestock 172 to be simultaneously both a printable area 182 and an expiration zone 186.

Example 8

FIGS. 8A-8D show an eighth example of a band with a peripheral tab similar in concept to the seventh embodiment of FIGS. 7A-7D, except that the tab is at a longitudinal end of the band (i.e., not along a lateral edge of the facestock), the ink is on the top surface of the facestock proximate that tab, the adhesive composition is on the top surface of the tab, and an additional separate adhesive composition is on the top surface at the other longitudinal end of the face stock.

Looking at FIGS. 8A-8D, a self-expiring identification band 200 having facestock 202 that is elongated in the longitudinal direction and a foldable tab 218 disposed at one longitudinal end of the facestock 202. As in prior examples, the facestock 202 has a top surface 202a and a bottom surface 202b. The tab 218 also has a top surface 218a and a bottom surface 218b.

The self-expiring identification band 200 has a first chemical composition 204 that is a soluble ink. The first chemical composition is disposed on a portion of the top surface 202a of the facestock 202 proximate the longitudinal end of the facestock 202 along which the tab 218 is disposed. Accordingly, the first chemical composition 204 is not disposed along substantially all of the length of the facestock 202 nor need it be; indeed, only a small percentage of the length of the facestock 202 may have the first chemical composition 204 on it commensurate with the length of the tab 218. It is contemplated that the first chemical composition 204 may be disposed on less than 10%, 15%, 20%, 25%, or 30% of the overall length of the facestock 202 (not including the tab 218), for example. As the length of the first chemical composition 204 generally corresponds to the length of the tab 218 which will be folded onto it, it also follows that the length of the tab 218 can be appreciably less than the length of the portion of the facestock 202 (not including the tab 218) with the tab 218 being similar percentages of the length of the facestock 202 (excluding the tab 218) when compared to the length of the facestock 202.

Figure 8A:
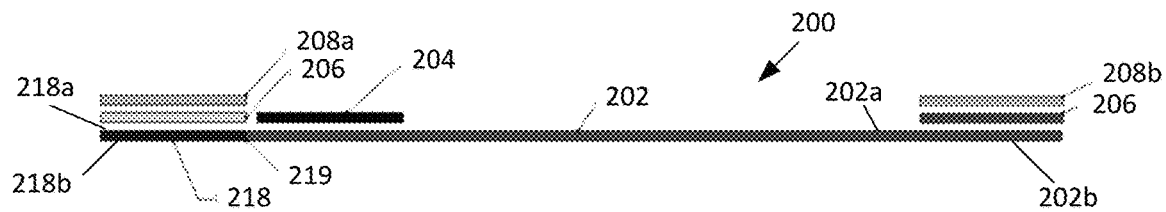
FIGS. 8A-8B are a schematic side and top view, respectively, of an eighth embodiment of a band with a peripheral tab similar to the seventh embodiment of FIGS. 7A-7D, except that the tab is along a different non-lateral edge of the facestock, the ink is on the top surface of the facestock, the adhesive composition is on the top surface of the tab, and an additional adhesive composition is on the bottom surface of the face stock.

The self-expiring identification band 200 also has a second chemical composition 206, which is an adhesive or adhesive-based (which as illustrated in FIG. 8A is on the rightmost longitudinal end of the band 200). The second chemical composition 206 is disposed on the top surface 218a of the tab 218.

In the form illustrated, the self-expiring identification band 200 also has additional adhesive disposed on the top surface 202a of the facestock 202. This adhesive may be the same adhesive as the second chemical composition 206 or may be a different adhesive that would not be coactive with the first chemical composition 204.

The self-expiring identification band 200 also has a release liner 208a disposed on the top surface 218a of the tab 182 such that covers and overlaps the second chemical composition 206. On the other longitudinal end of the band 200, there is also a release liner 208b covering the additional adhesive.

Figure 8B:
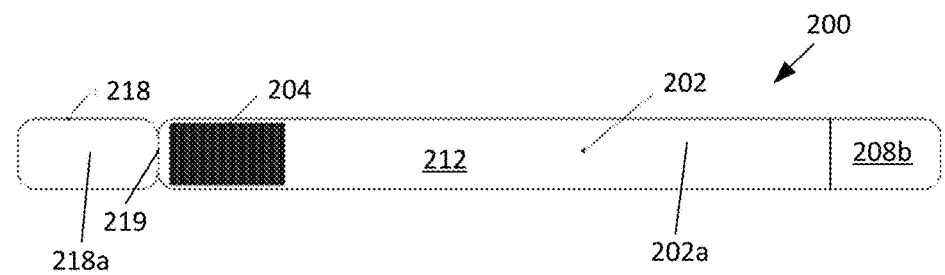
Figure 8C:
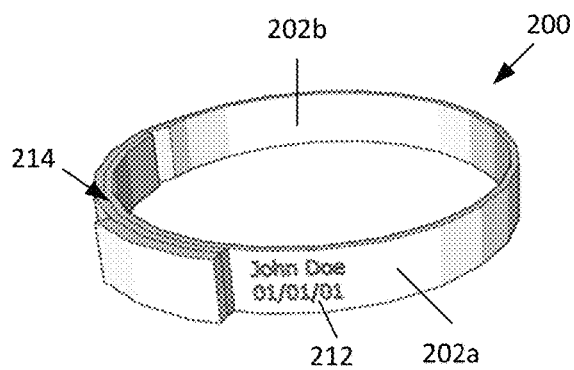
FIGS. 8C-8D are views of the eighth embodiment, after the tab has been folded and the band formed into a loop before and after it expires.
Figure 8D:
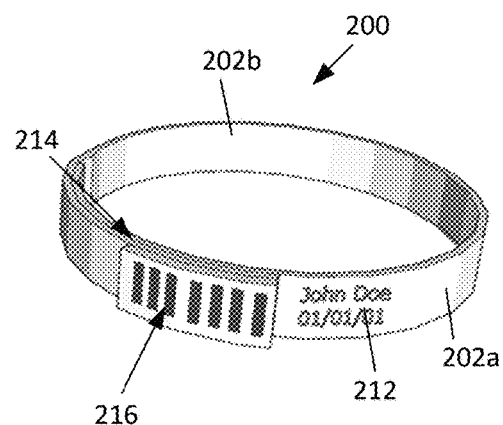

In used, the tab 218 is foldable at a line 219 (which may be a perforation line) in a clamshell manner, such that the top surface 218a of the tab 218 can be folded over onto the top surface 202a of the facestock 202, thereby forming an overlapped portion 214, best shown in FIG. 8C. When brought into contact with each other, the first chemical composition 204 and the second chemical composition 206 carried thereon coact with one another, to activate the band 200 and ultimately to create a visibly perceptible change upon timed expiration. This visibly perceptible change may be described as occurring at either the top surface 202a of the facestock 202 or the (initially) bottom surface 218b of the tab 218, after the tab 218 has been folded over. Areas of the top surface the band 200 in which a visibly perceptible change occurs upon the expiration shown in FIG. 8D are referred to herein as expiration zones 216.

In addition to the activation, the other release liner 208b can be removed to reveal the secondary attachment adhesive on the other longitudinal end. This adhesive may be independently used to form the loop by contacting the bottom side 202b of the facestock 202. Notably, the loop-forming and activation functions in this example are separate and independent from one another. This can mean, for example, that the band 200 may be activated at a pre-established time and will then expire after a certain duration has passed, regardless of whether the band 200 is actually worn or not by forming the band into a loop using the secondary attachment adhesive.

Again, as with the other examples, at least a portion of the top surface 202a of the facestock 202 offers a printable area 212. Printable areas 212 are disposed on the available top surface 202a of the band 200 and which would generally exclude the area of overlap of the tab 218 and the facestock 202.

FIG. 8C shows the embodiment of FIGS. 8A-8B after the tab 218 has been folded over for activation and after the secondary adhesive has been used to form a loop, before the band 200 expires. For activation, the release liner 208a has been removed and the tab 218 has been folded over the facestock 202 such that the tab 218 is in contact with the facestock 202. In this folded-over position, the first chemical composition 204 and the second chemical composition 206 (exposed upon removal of the release liner 208a) are disposed such that they contact each other in at least part of the overlapped portion 214. Within the overlapped portion 214, where the first chemical composition 204 and the second chemical composition contact 206 contact each other, they coact, and after a predetermined amount of time, they create a visibly perceptible change on the top surface the self-expiring identification band 200 that is then visible in the expired band view of FIG. 8D. Again, the portions of the top surface the self-expiring identification band 200 that bear such a visibly perceptible change are referred to as expiration zones 216).

Example 9

FIGS. 9A-9D show a ninth example of a band with a separate adhesive article that is separate (or could be separable) from the facestock for attachment to the band for activation.

In FIGS. 9A-9D, a self-expiring identification band 220 has facestock 222 that is elongated in the longitudinal direction. The facestock 222 has a top surface 222a and a bottom surface 222b. The self-expiring identification band 220 also has a first chemical composition 224 that is a soluble ink. The first chemical composition is disposed on a portion of the top surface 222a of the facestock 222. In the illustrated example, the first chemical composition 224 is disposed across the entire top surface 222a of the facestock 222 (or substantially close to the entirety of the top surface 222a). An adhesive 226 is disposed on at least a portion of the bottom surface 222b of the facestock 222. As illustrated, the adhesive 226 is disposed proximate one lateral end of the facestock 222, but it is contemplated that it could extend a greater length of the facestock 222 as in earlier examples.

In this particular example, the adhesive 226 on the bottom surface 222b of the facestock 222 may or may not contain the second chemical composition. The reason for this is that the activation in this example is primarily contemplated as being obtained by the affixation of an adhesive article 238, shown in FIG. 9B, on the first chemical composition 224 on the top surface 222a of the facestock 222. The adhesive 226 on the bottom side 222b of facestock 222 is primarily is used to form the secure loop of FIG. 9C after the release liner 228 is removed from it. However, it is considered that both affixation of an adhesive article 238 as well as the securement using adhesive 226 could be made to serve as activating events depending on a particularly desired use case.

With respect to the adhesive article 238, the adhesive article 238 may be provided either as being separate from or as being separable from the self-expiring identification band 220 (for example, the adhesive article 238 may be joined to a peripheral edge of the facestock 222 and separable therefrom at a perforation line). While just a single adhesive article 238 is shown as being used to activate the band 220 in this example, it is contemplated that there may be multiple adhesive articles 238 provided for attachment to the band 220, some of which could have different expiratory lengths.

With respect to the adhesive article 238, the adhesive article 238 can supports on one face of it the second chemical composition (not shown) in the form of an adhesive. As stated elsewhere throughout this disclosure, the first chemical composition (ink) is then readily soluble in this second chemical composition of the adhesive. It is contemplated that the chemicals, in one or both locations can have patterns or words formed in them by the use of negative space lacking at least one of the chemicals, so that upon coaction a pattern or word appears such as, for example, the word "VOID" as illustrated in FIG. 9D.

To activate the band 220, the adhesive article 238 can be applied to the top surface 222a of the facestock 222, such that the bottom surface of the adhesive article 238 contacts the top surface 222a of the facestock 222 to place the first and second chemical components into contact with one another such that they coact. This application could be at a predetermined location on the band 220 or may be anywhere over its length depending on the how the chemical composition is place on the surface of the band 220. During this placement, an overlapping portion 234 is formed in which the adhesive article 238 overlaps the top surface of the facestock 222a. When the adhesive article 238 is applied to the facestock 222, the adhesive article 238 becomes a component of the self-expiring identification band 220.

Figure 9A:
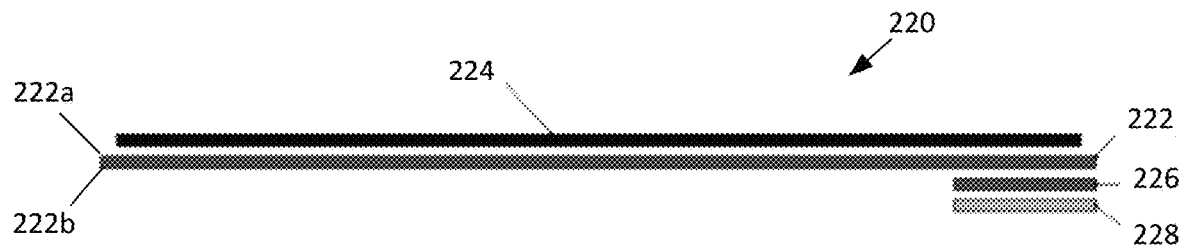
FIGS. 9A-9B are a schematic side and top view, respectively, of a ninth embodiment of a band, with a soluble ink on the top surface of the facestock and an adhesive composition capable of solubizing the ink disposed on the bottom surface of an adhesive article that is separate (or may be made to be separable from) the facestock for attachment to the band for activation.
Figure 9B:
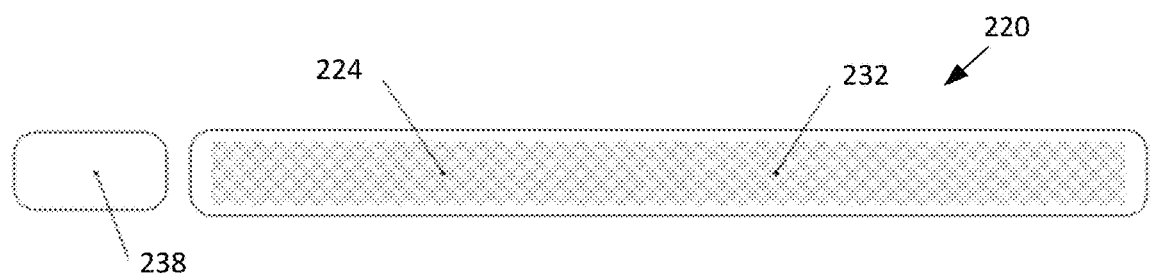
Figure 9C:
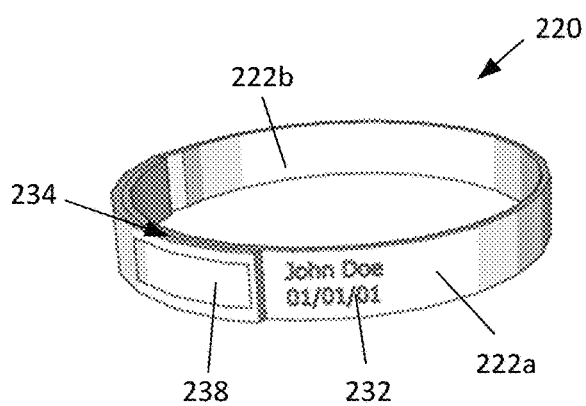
FIGS. 9C-9D are views of the ninth embodiment, after the band has been formed into a loop and activated before and after it expires.
Figure 9D:
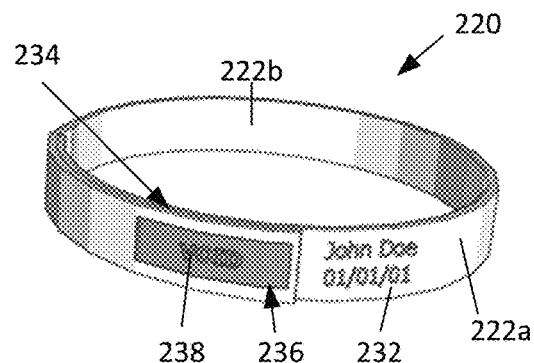

After a pre-determined amount of time, the first chemical composition 224 and the second chemical composition from the adhesive article coact to create a visible perceptible change on the top surface of the self-expiring identification band 220 as is illustrated in FIG. 9D. The portions of the top surface of the self-expiring identification band where such a visibly perceptible change occurs serve as one or more expiration zone(s) 236.

Again, at least a portion of the top surface 222a of the facestock 222 can also serve as a printable area 232. The printable area 232 shown in FIG. 9B does not bear any information or indicia of identification, but the looped forms of FIGS. 9C and 9D do show such printing having occurred before forming the loop.

Example 10

FIGS. 10A-10D show a tenth example of a band that shares some similarities with the ninth embodiment of FIGS. 9A-9D, except that in this tenth example, the so-called adhesive article or section has roughly the same dimensions as the face stock and is pre-attached to a base section with an intermediate release liner positioned therebetween so as to separate and form a barrier between the chemical components prior to activation.

Figure 10A:
FIGS. 10A-10B are a schematic side and bottom view, respectively, of a tenth embodiment of a band that other similar to the ninth embodiment of FIGS. 9A-9D, except that the adhesive article or section has roughly the same dimensions as the face stock and the adhesive composition is on the top surface of the adhesive article.
Figure 10B:
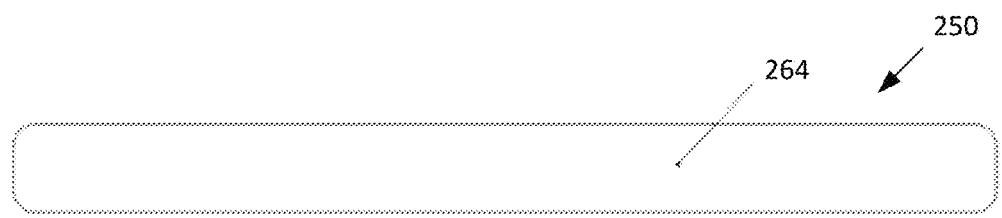
Figure 10C:
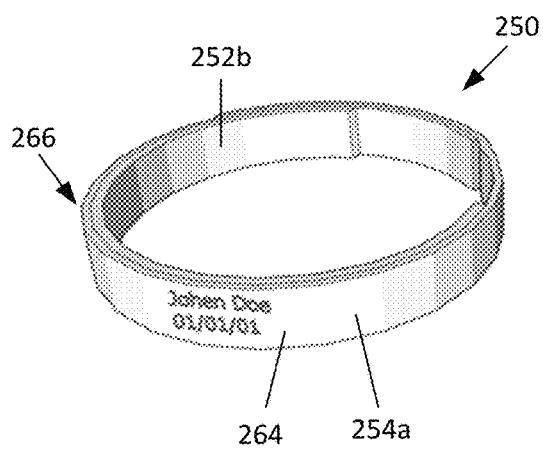
FIGS. 10C-10D are views of the tenth embodiment, before and after it expires.
Figure 10D:
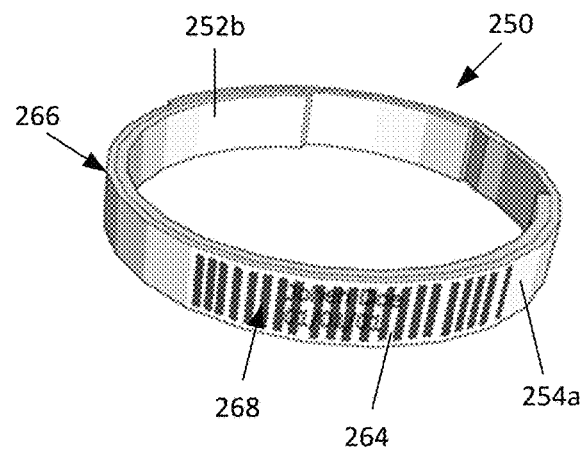

In this form, there is an underlying band structure similar to the first example in which a facestock 252 has a first chemical composition 256 (soluble ink) on a top surface 252a thereof and an adhesive 260 on a bottom side 252b thereof (initially covered by release liner 262 which may be scored at a score line 264 as previously mentioned). The adhesive 260 in this case need not contain the second chemical composition for activation, but rather the adhesive 260 in this example is primarily used for formation of the loop as shown in FIGS. 10C and 10D.

Notably, the tenth example is unique in that there is a release liner 262 that also overlays the first chemical composition 256 and, on the opposing side of this release liner 262, there is an adhesive article for activation that, as illustrated, is sized to match the size facestock 252.

This adhesive article includes a second facestock 254 which has an adhesive 258 on a lower surface 254a thereof. This adhesive 258 also serves as the second chemical component that is capable of solubilizing the ink of the first chemical component. The adhesive 258 stacked upon the aforementioned intermediate release liner 262 on a side of the release liner 262 opposite the side against the first chemical composition 256 or ink.

In this case, to activate the band 250, the adhesive article section (including layers 258 and 254) are peeled back from the base section (including layers 256, 252, 260, and 262). Once the layers of the adhesive article section and the base section are separated from one another, the intermediate release liner 256 is removed and the adhesive 258 carrying the second chemical composition is placed into direct contact with the ink or first chemical composition 256 to begin activation and coaction of the chemical components. Because the adhesive article section and the base section can be substantially the same size, this effectively can be an overlamination process at a region of overlap 266.

It is contemplated that in some forms, there these sections (i.e., the adhesive article section and the base section) could be separate from one another or they could be joined at a peripheral joint, edge, or fold to open and close in a clamshell or book-like manner. The advantage of a peripheral joint, edge, or fold is that it would assist with alignment of the two sections when they are contacted back together. In such case, certain differently numbered components may actually be the same component. For example, the facestock sections 254 and 252 may be continuous and joined at a fold and the ink, adhesive layers, and release liners may be placed on surfaces thereof to form the desired stack ups.

It is also contemplated that the "overlamination" process need not run the entire length, rather, it could be just a section, akin to the previous describe lateral tab examples.

After activation, the bottom release liner 262 (or a segment thereof) may be removed and a loop formed therefrom as illustrated in FIG. 10C. Prior to such activation or loop forming, the entire top surface 254b of the adhesive article section may be available for printing.

After a pre-established duration of time, some or all of the recombined band may will then exhibit a visual change in expiration zones 268 as shown in FIG. 10D. The particular regions of the expiration zones 268 will depend on the particular placement of the chemicals on the two sections and may take various forms including patterns, words, symbols, solid blocks, and so forth. As previously mentioned, it could extend for wide extents of the periphery or sections thereof (whether contiguous or not). Still further, the expiration zones 268 could be apart from or (as shown in FIG. 10D) coincide with regions having printing.

Many advantages flow from this tenth example. For instance, it is possible that a band may be produced with a large printable area (which can be machine printed as with a printer) and which also serves and an expiration zone. Further still, in this example, the activation mechanism is again independent of the loop-forming mechanism and so activation can be performed independently of attachment if that is desired for a particular use case.

While various representative embodiments have been illustrated, many general principles disclosed herein are contemplated as being independently employable as well as in all workable permutations and combinations. Further, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A self-expiring identification band comprising:
a facestock that is elongated in the longitudinal direction, having a top surface and a bottom surface;
a first chemical composition disposed on at least a portion of the top surface of the facestock, said portion of the top surface running at least a third of a length of the facestock; and
a second chemical composition disposed on at least a portion of the bottom surface of the facestock, said portion running at least a third of the length of the facestock;
wherein the first and second chemical compositions are coactable to cause a visually perceptible change to the top surface of the facestock.

2. The self-expiring identification band of claim 1, wherein the band is wrappable around an object such that the top surface of the band faces away from the object, the ends of the facestock overlap each other to form an overlapped portion, and the first chemical composition and the second chemical composition contact each other in at least a part of the overlapped portion to form an expiration zone.

3. The self-expiring identification band of claim 2, wherein, when the band is wrapped around an object such that a loop is formed, the expiration zone is visible from two opposing views of the band.

4. The self-expiring identification band of claim 2, wherein the expiration zone runs along at least 50% of the length of the facestock.

5. The self-expiring identification band of claim 1, wherein the first chemical composition is an ink that is soluble in the second chemical composition and wherein the second chemical composition comprises an adhesive.

6. The self-expiring identification band of claim 5, wherein the ink that is soluble comprises anthraquinone dyes and compositions made thereof.

7. The self-expiring identification band of claim 1, wherein the facestock comprises lateral edges and a central portion and wherein the first chemical composition is disposed proximate to the lateral edges of the facestock with a central portion being void of the first chemical composition.

8. The self-expiring identification band of claim 1, wherein portions of the facestock bearing the first chemical composition have a larger width than portions of the facestock not bearing the first chemical composition.

9. A self-expiring identification band comprising:
a facestock that is elongated in the longitudinal direction, having a top surface and a bottom surface;
a first chemical composition disposed on multiple, non-contiguous portions of the top surface of the facestock that are separated from each other by portions of the top surface of the facestock that do not bear the first chemical composition; and
a second chemical composition disposed on at least a portion of the bottom surface of the facestock;
wherein the first and second chemical compositions are coactable to cause a visually perceptible change to the top surface of the facestock;
wherein the top surface of the band defines 360 degrees when the band is wrapped around an object and wherein the largest portion of the facestock that does not bear the first chemical composition does not occupy more than 90 degrees of the wrapped band.

10. The self-expiring identification band of claim 9, wherein the portions of the top surface of the facestock that do not bear the first chemical composition separate the portions of the top surface of the facestock that do bear the first chemical composition along the longitudinal axis of the facestock.

11. The self-expiring identification band of claim 9, wherein the band is wrappable around an object, such that the top surface of the band faces away from the object, the ends of the facestock overlap each other to form an overlapped portion, and the first chemical composition and the second chemical composition contact each other in at least a part of the overlapped portion to form an expiration zone.

12. The self-expiring identification band of claim 11, comprising at least three expiration zones.

13. The self-expiring identification band of claim 9, wherein the first chemical composition is an ink that is soluble in the second chemical composition and wherein the second chemical composition comprises an adhesive.

14. The self-expiring identification band of claim 13, wherein the ink that is soluble comprises anthraquinone dyes and compositions made thereof.

15. The self-expiring identification band of claim 9, wherein the facestock comprises lateral edges and a central portion and wherein the first chemical composition is disposed proximate to the lateral edges of the facestock with the central portion being void of the first chemical composition.

16. A looped self-expiring identification band comprising:
a facestock that is elongated in the longitudinal direction between a pair of ends and having a top surface and a bottom surface;
a first chemical composition disposed on at least a portion of the top surface of the facestock; and
a second chemical composition disposed on at least a portion of the bottom surface of the facestock;
wherein the facestock is wrapped on itself to form a loop with the top surface of the band facing away from the object and the ends of the facestock overlapping each other to form an overlapped portion, the top surface of the band defining 360 degrees of the looped self-expiring identification band;
wherein, in at least a part of the overlapped portion, the first chemical composition and the second chemical composition contact each other and coact to form one or more expiration zones that provide a visually perceptible change at a pre-established time after contact; and
wherein, for each 180 degree section of the 360 degrees of the looped self-expiring identification band, one or more of the one or more expiration zones are positioned at least in part in that respective 180 degree section.

17. A self-expiring identification band comprising:
a facestock that is elongated in the longitudinal direction, having a top surface and a bottom surface;
a foldable tab disposed along at least part of an edge of the facestock;
a first chemical composition disposed on at least a portion of the bottom surface of the foldable tab; and
a second chemical composition disposed on at least a portion of the bottom surface of the facestock;
wherein the first and second chemical compositions are coactable to cause a visually perceptible change to the top surface of the facestock;
wherein, when the tab is folded such that a portion of the top surface of the tab bearing the first chemical composition contacts at least part of a portion of the top surface of the facestock bearing the second chemical composition, an overlapped portion is formed in which the first chemical composition and the second chemical composition contact each other in at least a part of the overlapping portion to form at least one expiration zone in which the first and second chemical compositions coact to cause the visually perceptible change to the band in the expiration zone;

wherein the overlapped portion runs along less than an entire length of the facestock.

18. The self-expiring identification band of claim 17, wherein the overlapped portion runs along less than 80% of a length of the facestock.

19. The self-expiring identification band of claim 17, wherein the first chemical composition is an ink that is soluble in the second chemical composition and wherein the second chemical composition comprises an adhesive.

20. The self-expiring identification band of claim 19, wherein the ink that is soluble comprises anthraquinone dyes and compositions made thereof.

21. The self-expiring identification band of claim 17, wherein the tab is disposed along at least part of a lateral edge of the facestock.

22. The self-expiring identification band of claim 17, wherein the tab is disposed along at least part of a longitudinal edge of the facestock.

23. A self-expiring identification band comprising:
a facestock that is elongated in the longitudinal direction, having a top surface and a bottom surface;
an adhesive article having a bottom surface and a top surface, the adhesive article initially being detachable or separate from the elongated band;
a first chemical composition disposed on at least a portion of the top surface of the facestock; and
a second chemical composition disposed on at least a portion of the bottom surface of the adhesive article;
wherein, as an activation function, the adhesive article is applicable to the facestock such that at least part of the bottom surface of the adhesive article contacts at least part of the top surface of the facestock to form an overlapped portion and wherein the first and second chemical compositions are coactable to cause a visually perceptible change to the top surface of the adhesive article;
wherein the activating function is independent from a loop-forming function in which the facestock is formed into a loop around an object.

24. The self-expiring identification band of claim 23, wherein, when the adhesive article is applied to the facestock such that a portion of the bottom surface of the adhesive article bearing the second chemical composition contacts at least part of a portion of the top surface of the facestock bearing the first chemical composition, an overlapped portion is formed, and the first chemical composition and the second chemical composition contact each other in at least a part of the overlapping portion to form at least one expiration zone and coact to cause the visually perceptible change to the band in the expiration zone.

25. The self-expiring identification band of claim 23, wherein the first chemical composition is an ink that is soluble in the second chemical composition and wherein the second chemical composition comprises an adhesive.

26. The self-expiring identification band of claim 25, wherein the ink that is soluble comprises anthraquinone dyes and compositions made thereof.

27. A method of using a self-expiring identification band, the method comprising:
printing information on a portion of the self-expiring identification band, the self-expiring identification band comprising a facestock that is elongated in the longitudinal direction and the self-expiring identification band further comprising both a first and a second chemical composition, wherein the first chemical composition is disposed on at least a portion of a top surface of the facestock, said portion of the top surface running at least a third of a length of the facestock and wherein the second chemical composition is disposed on at least a portion of a bottom surface of the facestock, said portion running at least a third of the length of the facestock;
manipulating the self-expiring identification band such that the first chemical composition and second chemical composition contact each other, and
coacting the first and second chemical compositions for a predetermined amount of time, such that after said predetermined amount of time there is a visibly perceptible change on the top surface of the band.

28. The method of claim 27, further comprising a step of machine printing information on a portion of the self-expiring identification band.

29. The method of claim 27, further comprising wrapping the self-expiring identification band around an object, such that at least a portion of the band overlaps itself.

30. The method of claim 27, further comprising wrapping the self-expiring identification band around a body part, such that at least a portion of the band overlaps itself.

31. The method of claim 27, further comprising wrapping the self-expiring identification band around a wrist, such that at least a portion of the band overlaps itself.

* * * * *

UNITED STATES PATENT AND TRADEMARK OFFICE
CERTIFICATE OF CORRECTION

PATENT NO. : 11,699,362 B2
APPLICATION NO. : 17/313776
DATED : July 11, 2023
INVENTOR(S) : Jeana Church et al.

It is certified that error appears in the above-identified patent and that said Letters Patent is hereby corrected as shown below:

In the Specification

Column 15, Line 18, "line (as" should be --line 62 (as--.

Signed and Sealed this
Third Day of October, 2023

Katherine Kelly Vidal
*Director of the United States Patent and Trademark Office*